United States Patent
Ueda et al.

(10) Patent No.: US 8,552,716 B2
(45) Date of Patent: Oct. 8, 2013

(54) TESTING METHODS FOR MAGNETIC HEADS AND MAGNETIC STORAGE DEVICES ASSEMBLED WITH THE MAGNETIC HEADS

(75) Inventors: Fumiomi Ueda, Sagamihara (JP); Makoto Ono, Yokohama (JP)

(73) Assignee: HGST Netherlands B.V., Amsterdam (NL)

(*) Notice: Subject to any disclaimer, the term of this patent is extended or adjusted under 35 U.S.C. 154(b) by 386 days.

(21) Appl. No.: 12/963,551

(22) Filed: Dec. 8, 2010

(65) Prior Publication Data

US 2011/0134559 A1    Jun. 9, 2011

(30) Foreign Application Priority Data

Dec. 9, 2009    (JP) .................. 2009-279575

(51) Int. Cl.
 *G01R 33/12* (2006.01)
(52) U.S. Cl.
 USPC .......................... 324/210; 324/262
(58) Field of Classification Search
 USPC ................................ 324/210, 262
 See application file for complete search history.

(56) References Cited

U.S. PATENT DOCUMENTS

| | | |
|---|---|---|
| 7,218,093 B2 | 5/2007 | Cirkel et al. |
| 2009/0217510 A1 | 9/2009 | Katsumura |
| 2009/0225476 A1 | 9/2009 | Fukuyama et al. |

FOREIGN PATENT DOCUMENTS

| | | |
|---|---|---|
| JP | 08-274139 A | 10/1996 |
| JP | 2005-538562 A | 12/2005 |
| JP | 2007-059797 A | 3/2007 |
| JP | 2009-205774 A | 9/2009 |
| JP | 2009-211758 A | 9/2009 |

*Primary Examiner* — Reena Aurora
(74) *Attorney, Agent, or Firm* — Zilka-Kotab, PC

(57) ABSTRACT

In one embodiment, a manufacturing method for magnetic heads includes classifying magnetic heads into one of: a first tested head class, and a non-test-candidate head class, determining characteristic values of the magnetic heads classified in the first tested head class, estimating characteristic values of the magnetic heads classified in the non-test-candidate head class, wherein the estimating is based on the characteristic values of the magnetic heads classified in the first tested head class, classifying each of the magnetic heads classified in the non-test-candidate head class into one of: a second tested head class, and a non-test head class based on the estimated characteristic values, determining characteristic values of the magnetic heads classified in the second tested head class, and screening magnetic heads in the second tested head class based on the determined characteristic values of the magnetic heads classified in the second tested head class.

22 Claims, 28 Drawing Sheets

| Item | Data |
|---|---|
| Measure | 1 |
| Skip | 3 |
| Start | 0 |
| End | 1 |

FIG. 13

| Parameter | Pass-A LowerLimit | Pass-A UpperLimit | Pass-B LowerLimit | Pass-B UpperLimit |
|---|---|---|---|---|
| MWW | 110 | 120 | 120 | 130 |
| SQZ | 20 | 20 | 0 | 20 |
| OW | 25 | | 25 | |

FIG. 14

| Parameter | Pass-C LowerLimit | Pass-C UpperLimit | Pass-D LowerLimit | Pass-D UpperLimit |
|---|---|---|---|---|
| MWW | 115 | 120 | 120 | 125 |
| SQZ | 0 | 18 | 0 | 18 |
| OW | 30 | | 30 | |

FIG. 15

| Position | Static Test Judge | Sampling Flag | Dynamic Test Measurement | | | Dynamic Test Judge |
|---|---|---|---|---|---|---|
| | | | MWW | SQZ | OW | |
| C01 | Fail | | | | | |
| C02 | Pass | Measure | 133.26 | 3.84 | 39.98 | |
| C03 | Pass | Skip | | | | |
| C04 | Pass | Skip | | | | |
| C05 | Pass | Skip | | | | |
| C06 | Pass | Measure | 134.11 | 4.8 | 38.39 | |
| C07 | Pass | Skip | | | | |
| C08 | Fail | | | | | |
| C09 | Pass | Skip | | | | |
| C10 | Pass | Skip | | | | |
| C11 | Pass | Measure | 127.71 | 11.72 | 40.53 | |
| C12 | Pass | Skip | | | | |
| C13 | Pass | Skip | | | | |
| C14 | Fail | | | | | |
| C15 | Pass | Skip | | | | |
| C16 | Pass | M... | ...2.2 | 14.97 | ... | |
| C54 | | Skip | | | | |
| C55 | Pass | Measure | 118.16 | 16.95 | 35.06 | |
| C56 | Pass | Skip | | | | |
| C57 | Pass | Skip | | | | |
| C58 | Pass | Skip | | | | |
| C59 | Pass | Measure | 115.38 | 18.49 | 34.28 | |
| C60 | Fail | | | | | |

FIG. 18

|Position|Static Test Judge|Sampling Flag|Dynamic Test Measurement| | |Dynamic Test Judge|
|---|---|---|---|---|---|---|
| | | |MWW|SQZ|OW| |
|C01|Fail| | | | | |
|C02|Pass|Measure|133.26|3.84|39.98|Fail|
|C03|Pass|Skip|133.473|4.08|39.5825|Measure|
|C04|Pass|Skip|133.685|4.32|39.185|Measure|
|C05|Pass|Skip|133.898|4.56|39.7875|Measure|
|C06|Pass|Measure|134.11|4.8|38.39|Fail|
|C07|Pass|Skip|132.83|6.184|38.818|Measure|
|C08|Fail| | | | | |
|C09|Pass|Skip|130.27|8.952|39.674|Measure|
|C10|Pass|Skip|128.99|10.336|40.102|Measure|
|C11|Pass|Measure|127.71|11.72|40.53|Pass-A|
|C12|Pass|Skip|125.654|12.37|39|Measure|
|C13|Pass|Skip|123.598|13.02|37.47|Pass-C|
|C14|Fail| | | | | |
|C15|Pass|Skip|119.486|14.32|34.41|Pass-D|
|C16|Pass|Me...|...43|14.97|...|...B|
|C54| |Skip|118.21| |35.11|Pass-...|
|C55|Pass|Measure|118.16|16.95|35.06|Pass-B|
|C56|Pass|Skip|117.465|17.335|34.865|Pass-D|
|C57|Pass|Skip|116.77|17.72|34.67|Pass-D|
|C58|Pass|Skip|116.075|18.105|34.475|Measure|
|C59|Pass|Measure|115.38|18.49|34.28|Pass-B|
|C60|Fail| | | | | |

| Position | Static Test Judge | Sampling Flag | Dynamic Test Measurement | | | Dynamic Test Judge |
|---|---|---|---|---|---|---|
| | | | MWW | SQZ | OW | |
| C01 | Fail | | | | | |
| C02 | Pass | Measure | 133.26 | 3.84 | 39.98 | Fail |
| C03 | Pass | Skip | 132.11 | 5.13 | 38.13 | Fail |
| C04 | Pass | Skip | 128.51 | 8.31 | 37.15 | Pass-A |
| C05 | Pass | Skip | 125.83 | 7.01 | 38.54 | Pass-A |
| C06 | Pass | Measure | 126.71 | 4.8 | 38.39 | Fail |
| C07 | Pass | Skip | 126.87 | 6.18 | 37.81 | Pass-A |
| C08 | Fail | | | | | |
| C09 | Pass | Skip | 127.43 | 8.88 | 38.35 | Pass-A |
| C10 | Pass | Skip | 126.53 | 10.13 | 40.01 | Pass-A |
| C11 | Pass | Measure | 127.71 | 11.72 | 40.53 | Pass-A |
| C12 | Pass | Skip | 124.88 | 12.37 | 39.33 | Pass-A |
| C13 | Pass | Skip | 123.598 | 13.02 | 37.47 | Pass-C |
| C14 | Fail | | | | | |
| C15 | Pass | Skip | 119.486 | 14.32 | 34.41 | Pass-D |
| C16 | Pass | M... | ...43 | 14.97 | ... | ...B |
| C54 | | Skip | 118.21 | | 35.11 | Pass-C |
| C55 | Pass | Measure | 118.16 | 16.95 | 35.06 | Pass-B |
| C56 | Pass | Skip | 117.465 | 17.335 | 34.865 | Pass-D |
| C57 | Pass | Skip | 116.77 | 17.72 | 34.67 | Pass-D |
| C58 | Pass | Skip | 115.89 | 17.77 | 35.31 | Pass-B |
| C59 | Pass | Measure | 115.38 | 18.49 | 34.28 | Pass-B |
| C60 | Fail | | | | | |

First Sampling Rate (%)

| Strict Criteria Range (nm) | 50 | 33.3 | 25 | 20 | 16.7 | 14.3 | 12.5 | 11.1 | 10 | 9.09 | 8.33 |
|---|---|---|---|---|---|---|---|---|---|---|---|
| 20 | 67.3 | 56.2 | 51 | 48.1 | 45.8 | 44.6 | 43.6 | 42.8 | 42.3 | 41.7 | 41 |
| 19.6 | 67.7 | 56.8 | 51.7 | 48.8 | 46.6 | 45.4 | 44.4 | 43.6 | 43.2 | 42.6 | 41.9 |
| 19.2 | 68.2 | 57.5 | 52.4 | 49.6 | 47.4 | 46.3 | 45.3 | 44.5 | 44.1 | 43.5 | 42.8 |
| 18.8 | 68.7 | 58.2 | 53.2 | 50.5 | 48.3 | 47.1 | 46.2 | 45.4 | 45 | 44.4 | 43.8 |
| 18.4 | 69.2 | 58.9 | 54 | 51.3 | 49.1 | 48 | 47 | 46.3 | 45.9 | 45.3 | 44.7 |
| 18 | 69.8 | 59.6 | 54.7 | 52.1 | 50 | 48.9 | 48 | 47.2 | 46.9 | 46.3 | 45.6 |
| 17.6 | 70.3 | 60.3 | 55.5 | 53 | 50.9 | 49.8 | 48.9 | 48.2 | 47.8 | 47.3 | 46.6 |
| 17.2 | 70.8 | 61 | 56.3 | 53.8 | 51.7 | 50.8 | 49.8 | 49.1 | 48.8 | 48.2 | 47.6 |
| 16.8 | 71.4 | 61.7 | 57.1 | 54.7 | 52.6 | 51.7 | 50.7 | 50.1 | 49.8 | 49.2 | 48.6 |
| 16.4 | 71.9 | 62.5 | 58 | 55.6 | 53.6 | 52.7 | 51.7 | 51.1 | 50.8 | 50.3 | 49.6 |
| 16 | 72.5 | 63.2 | 58.8 | 56.5 | 54.5 | 53.6 | 52.6 | 52.1 | 51.8 | 51.3 | 50.6 |
| 15.6 | 73.1 | 64 | 59.7 | 57.4 | 55.5 | 54.6 | 53.6 | 53.1 | 52.8 | 52.4 | 51.6 |
| 15.2 | 73.7 | 64.8 | 60.5 | 58.3 | 56.4 | 55.6 | 54.6 | 54.1 | 53.9 | 53.4 | 52.7 |
| 14.8 | 74.3 | 65.6 | 61.4 | 59.2 | 57.4 | 56.6 | 55.6 | 55.2 | 54.9 | 54.5 | 53.7 |
| 14.4 | 74.8 | 66.4 | 62.3 | 60.2 | 58.4 | 57.6 | 56.6 | 56.3 | 56 | 55.5 | 54.8 |
| 4.8 | 91.1 | 88.1 | 86.6 | 85.8 | 85.3 | 85 | 84.5 | 84.6 | 84.5 | 84.2 | 83.9 |
| 4.4 | 91.8 | 89.1 | 87.7 | 87 | 86.5 | 86.3 | 85.8 | 85.8 | 85.8 | 85.5 | 85.2 |
| 4 | 92.5 | 90 | 88.8 | 88.2 | 87.7 | 87.5 | 87 | 87.1 | 87.1 | 86.8 | 86.6 |
| 3.6 | 93.3 | 91 | 89.9 | 89.3 | 89 | 88.8 | 88.3 | 88.4 | 88.3 | 88.1 | 87.9 |
| 3.2 | 94 | 92 | 91.1 | 90.5 | 90.2 | 90 | 89.6 | 89.7 | 89.6 | 89.4 | 89.2 |
| 2.8 | 94.7 | 93 | 92.2 | 91.7 | 91.4 | 91.3 | 90.9 | 90.9 | 90.9 | 90.8 | 90.5 |
| 2.4 | 95.5 | 94 | 93.3 | 92.9 | 92.6 | 92.5 | 92.2 | 92.2 | 92.2 | 92.1 | 91.9 |
| 2 | 96.3 | 95 | 94.4 | 94 | 93.9 | 93.7 | 93.5 | 93.5 | 93.5 | 93.4 | 93.2 |

FIG. 28

| Strict Criteria Range(nm) | First Sampling Rate(%) | Failure Rate in Shipment(%) |
|---|---|---|
| 18 | 50 | 1 |
| 12.8 | 33.3 | 1.21 |
| 11.2 | 25 | 1.53 |
| 10.8 | 20 | 1.91 |
| 10.4 | 16.7 | 2.24 |
| 10 | 14.3 | 2.35 |
| 9.6 | 12.5 | 2.45 |
| 9.6 | 11.1 | 2.66 |
| 9.6 | 10 | 2.73 |
| 9.6 | 9.09 | 2.9 |
| 9.2 | 8.33 | 2.99 |

FIG. 29

| Strict Criteria Range(nm) | First Sampling Rate(%) | Total Sampling Rate(%) |
|---|---|---|
| 18 | 50 | 69.8 |
| 10.4 | 33.3 | 74.9 |
| 64 | 25 | 82.3 |
| 4 | 20 | 88.2 |
| 2.4 | 16.7 | 92.6 |
| 2 | 14.3 | 93.7 |

| Wafer | Row | Position | Static Test Judge | Dynamic Test Judge | Predict Flag | MRDCR | OW |
|---|---|---|---|---|---|---|---|
| AA1234 | R050 | C57 | Pass | Pass-D | Predict | 453.4 | 34.67 |
| AA1234 | R050 | C58 | Pass | Pass-B | Measure | 391.3 | 34.475 |
| AA1234 | R050 | C59 | Pass | Pass-B | Measure | 363.4 | 34.28 |
| AA1234 | R050 | C60 | Fail | | | 1053.3 | |
| AA1251 | R134 | C01 | Fail | | | 1303.1 | |
| AA1251 | R134 | C02 | Pass | Pass-A | Measure | 434.5 | 29.31 |
| AA1251 | R134 | C03 | Pass | Pass-C | Predict | 513.1 | 29.717 |
| AA1251 | R134 | C04 | Pass | Pass-C | Predict | 731.5 | 30.123 |
| AA1251 | R134 | C05 | Pass | Pass-A | Measure | 459.1 | 30.53 |
| AA1~ | | | Pass | | | 483.5 | |
| ~57 | R358 | C~ | | ~ss-B | Predict | | 40.1 |
| AA1157 | R358 | C57 | Pass | Pass-B | Measure | 860.1 | 40.2 |
| AA1157 | R358 | C58 | Pass | Fail | Measure | 519.3 | 18.5 |
| AA1157 | R385 | C59 | Pass | Fail | Measure | 602.3 | 19.5 |
| AA1157 | R385 | C60 | Fail | | | 1588.3 | |

FIG. 32

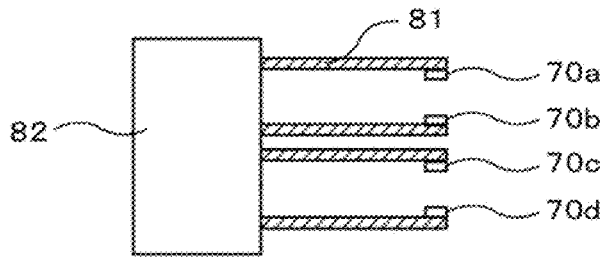

| Head | Product Type 1 | Product Type 2 |
|---|---|---|
| 70a | Pass-A or Pass-C | Pass-B or Pass-D |
| 70b | Pass-A or Pass-C | Pass-B or Pass-D |
| 70c | Pass-A or Pass-C | Pass-B or Pass-D |
| 70d | Pass-A or Pass-C | Pass-B or Pass-D |

← 1501

| Head | Product Type 3 | Product Type 4 |
|---|---|---|
| 70a | Pass-A or Pass-C | Pass-B or Pass-D |
| 70b | Pass-A | Pass-B |
| 70c | Pass-A | Pass-B |
| 70d | Pass-A or Pass-C | Pass-B or Pass-D |

← 1502

| Head | Product Type 5 |
|---|---|
| 70a | Pass-A or Pass-C |
| 70b | Pass-B or Pass-D |
| 70c | Pass-B or Pass-D |
| 70d | Pass-A or Pass-C |

← 1503

| Head | Product Type 6 | Product Type 7 | Product Type 8 | Product Type 9 |
|---|---|---|---|---|
| 70a | Pass-A | Pass-B | Pass-C | Pass-D |
| 70b | Pass-A | Pass-B | Pass-C | Pass-D |
| 70c | Pass-A | Pass-B | Pass-C | Pass-D |
| 70d | Pass-A | Pass-B | Pass-C | Pass-D |

TESTING METHODS FOR MAGNETIC HEADS AND MAGNETIC STORAGE DEVICES ASSEMBLED WITH THE MAGNETIC HEADS

RELATED APPLICATIONS

The present application claims priority to a Japanese Patent Application filed Dec. 9, 2009 under Appl. No. 2009-279575, which is incorporated herein by reference.

FIELD OF THE INVENTION

The present invention relates to manufacturing systems and methods for magnetic heads and magnetic storage devices assembled with one or more magnetic heads.

BACKGROUND OF THE INVENTION

The surface recording densities of magnetic storage devices such as hard disk drives have been increasing, necessitating the purchase and utilization of large numbers of expensive testing devices (testers) in order to select magnetic heads that are capable of achieving these high recording densities. Meanwhile, the price of magnetic storage devices has decreased, and the reduction of manufacturing costs has become an important issue that the manufacturers of magnetic storage device must address.

In order to address these trends, one approach of switching over from exhaustive testing to sampled testing in the selection tests which are performed on magnetic heads before they are transported from the magnetic head manufacturing plant to the magnetic storage device assembly plant has been examined, which can reduce the number of magnetic head testing devices used and may result in reducing overall manufacturing costs.

Similar issues exist in semiconductor manufacturing plants as well as in magnetic head manufacturing slants. For example, in Japanese Unexamined Patent Application Publication No. H8-274139, in order to reduce the time required for testing of semiconductor chips, only chips formed at predetermined sampling positions are tested instead of testing all the chips formed on the wafer surface, and the decision whether or not to test the other chips is then made based on the results of these tests. A criterion used in making this decision is the yield for each wafer; if a wafer has a high yield, then the sampling test results are relied upon and the chips are shipped without further testing.

In Japanese Unexamined Patent Application Publication No. H8-274139, a wafer with a high yield is trusted on the basis of the sampling tests alone, so all the semiconductor chips formed on the surface of this wafer are assumed to be good and are shipped. However, it is not possible to avoid having a considerable quantity of defective parts included among the shipped chips.

When sampling tests are applied to magnetic heads, it is necessary to quantify the proportion of defective parts included among the magnetic heads shipped from the magnetic head manufacturing plant to the magnetic storage device assembly plant, and to determine the unit cost per magnetic head based on the proportion of defective parts. When the proportion of defective parts increases, the failure rate of the assembled magnetic storage devices becomes higher, leading to higher manufacturing costs for the magnetic storage devices. On the other hand, subjecting the magnetic heads to sampling tests makes it possible to reduce the magnetic head manufacturing costs compared with heads that are subjected to exhaustive tests, thus allowing the unit cost per magnetic head to be reduced. To properly manage this trade-off relationship, it is necessary to reduce the defect inclusion ratio as much as possible, and to adjust this ratio to an appropriate value.

When magnetic heads are subjected to sampling tests, the magnetic head test results are fed forward as disclosed in Japanese Unexamined Patent Application Publication No. 2009-205774 and Japanese Unexamined Patent Application Publication No. 2009-211758, and it becomes difficult or impossible to apply control techniques to the magnetic storage device manufacturing process.

Therefore, testing and manufacturing methods for magnetic heads which alleviate the problems associated with prior art techniques would be very beneficial.

SUMMARY OF THE INVENTION

In one embodiment, a manufacturing method for magnetic heads includes classifying each of a plurality of magnetic heads into one of: a first tested head class, and a non-test-candidate head class, determining characteristic values of the magnetic heads classified in the first tested head class, screening magnetic heads in the first tested head class based on the determined characteristic values of the magnetic heads classified in the first tested head class, estimating characteristic values of the magnetic heads classified in the non-test-candidate head class, wherein the estimating is based on the characteristic values of the magnetic heads classified in the first tested head class, classifying each of the magnetic heads classified in the non-test-candidate head class into one of: a second tested head class, and a non-test head class, wherein the classifying is based on the estimated characteristic values of the magnetic heads classified in the non-test-candidate head class, determining characteristic values of the magnetic heads classified in the second tested head class, and screening magnetic heads in the second tested head class based on the determined characteristic values of the magnetic heads classified in the second tested head class.

In another embodiment, a manufacturing method for a magnetic storage device assembled with one or more magnetic heads includes preparing a substrate for forming a plurality of magnetic heads thereon, forming the plurality of magnetic heads on the substrate, assembling the plurality of magnetic heads into magnetic storage devices, testing at least some of the plurality of magnetic heads to obtain characteristic values, estimating characteristic values of non-tested magnetic heads on which testing is not performed using the characteristic values of the tested magnetic heads, classifying the non-tested magnetic heads based on the estimated characteristic values, assembling the magnetic heads classified as non-tested magnetic heads into the magnetic storage devices according to assembly rules, measuring performance of the magnetic storage devices assembled with the non-tested magnetic heads, and screening the magnetic storage devices assembled with the non-tested magnetic heads.

In another embodiment, a system includes logic adapted for classifying each of a plurality of magnetic heads into one of: a first tested head class, and a non-test-candidate head class, logic adapted for determining characteristic values of the magnetic heads classified in the first tested head class, logic adapted for estimating characteristic values of the magnetic heads classified in the non-test-candidate head class, wherein the estimating is based on the characteristic values of the magnetic heads classified in the first tested head class, logic adapted for classifying each of the magnetic heads classified in the non-test-candidate head class into one of: a second tested head class, and a non-test head class, wherein the classifying is based on the estimated characteristic values of the magnetic heads classified in the non-test-candidate head class, logic adapted for determining characteristic values of the magnetic heads classified in the second tested head class, and logic adapted for screening magnetic heads in the second tested head class based on the determined characteristic values of the magnetic heads classified in the second tested head class.

In yet another embodiment, a computer program product may include computer readable medium having computer readable code stored thereon, the computer readable medium including computer readable code adapted for classifying each of a plurality of magnetic heads into one of: a first tested head class, and a non-test-candidate head class, computer readable code adapted for determining characteristic values of the magnetic heads classified in the first tested head class, computer readable code adapted for estimating characteristic values of the magnetic heads classified in the non-test-candidate head class, wherein the estimating is based on the characteristic values of the magnetic heads classified in the first tested head class, computer readable code adapted for classifying each of the magnetic heads classified in the non-test-candidate head class into one of: a second tested head class, and a non-test head class, wherein the classifying is based on the estimated characteristic values of the magnetic heads classified in the non-test-candidate head class, computer readable code adapted for determining characteristic values of the magnetic heads classified in the second tested head class, and computer readable code adapted for screening magnetic heads in the second tested head class based on the determined characteristic values of the magnetic heads classified in the second tested head class.

Any of these embodiments may be implemented in a magnetic data storage system such as a disk drive system, which may include a magnetic head, a drive mechanism for passing a magnetic storage medium (e.g., hard disk) over the head, and a control unit electrically coupled to the head for controlling operation of the head.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 13 is a diagram which shows an example of a sampling rule, according to one embodiment.

FIG. 14 is a diagram which shows examples of criteria for dynamic electromagnetic tests, according to one embodiment.

FIG. 15 is a diagram which shows examples of criteria for the predicted values, according to one embodiment.

FIG. 18 is a diagram which shows an example of a magnetic head characteristics table, according to one embodiment.

FIG. 19 is a diagram which shows an example of a magnetic head characteristics table, according to one embodiment.

FIG. 20 is a diagram which shows an example of a magnetic head characteristics table, according to one embodiment.

FIG. 28 is a diagram which shows an example of how the overall sampling rate varies with the first sampling rate and criteria for estimation, according to one embodiment.

FIG. 29 is a diagram which shows an example of the inclusion rate of defective heads when the overall sampling rate is fixed, according to one embodiment.

FIG. 30 is a diagram which shows an example of the overall sampling rate when the inclusion rate of defective heads is fixed, according to one embodiment.

FIG. 32 is a diagram which shows an example of a table in the test results database, according to one embodiment.

FIG. 33 is a diagram which shows an example of the combinations of magnetic heads, according to one embodiment.

DETAILED DESCRIPTION

Figure 1:
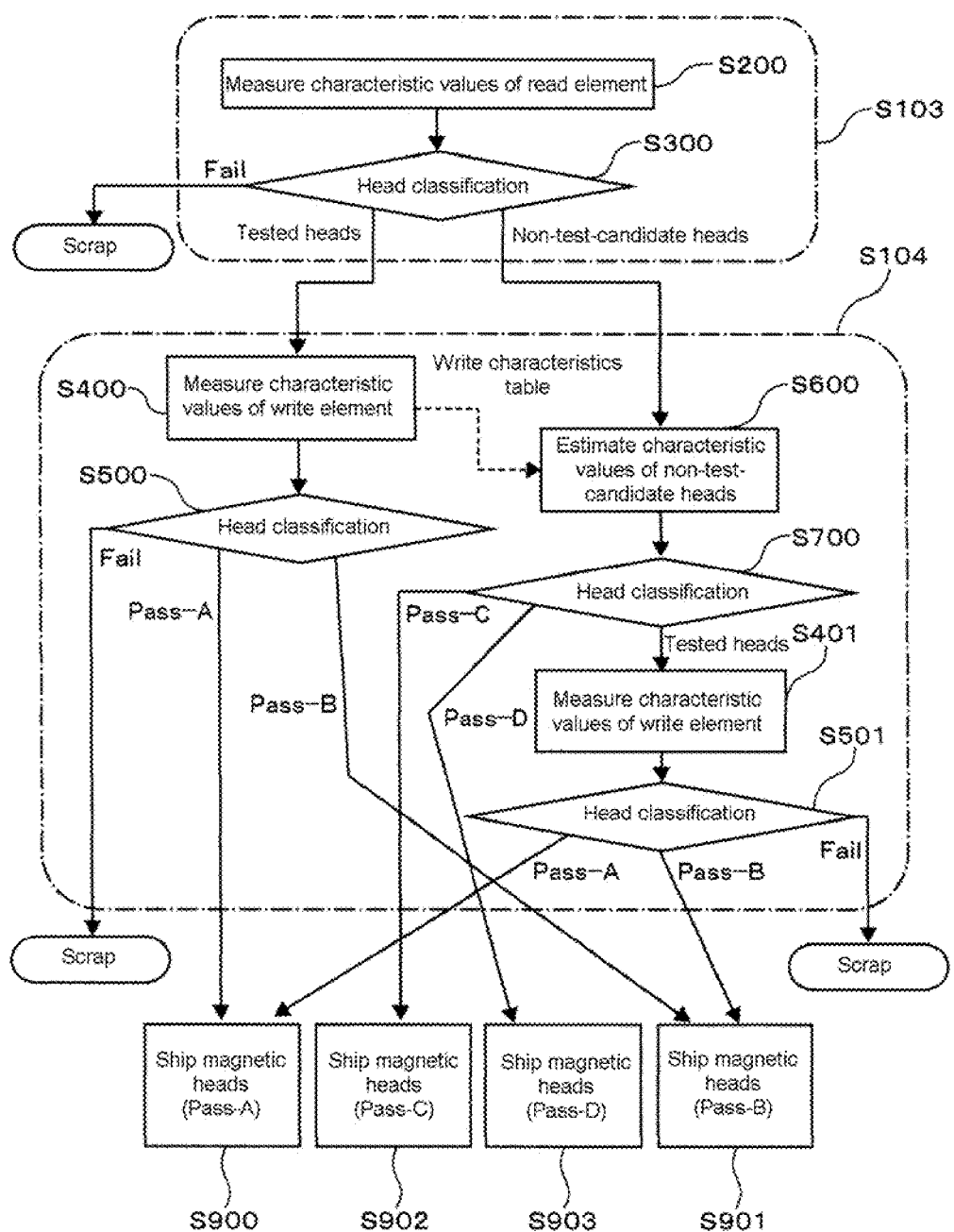
FIG. 1 is a diagram which shows an example of a magnetic head test procedure, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a manufacturing method for magnetic heads includes classifying each of a plurality of magnetic heads into one of: a first tested head class, and a non-test-candidate head class, determining characteristic values of the magnetic heads classified in the first tested head class, screening magnetic heads in the first tested head class based on the determined characteristic values of the magnetic heads classified in the first tested head class, estimating characteristic values of the magnetic heads classified in the non-test-candidate head class, wherein the estimating is based on the characteristic values of the magnetic heads classified in the first tested head class, classifying each of the magnetic heads classified in the non-test-candidate head class into one of: a second tested head class, and a non-test head class, wherein the classifying is based on the estimated characteristic values of the magnetic heads classified in the non-test-candidate head class, determining characteristic values of the magnetic heads classified in the second tested head class, and screening magnetic heads in the second tested head class based on the determined characteristic values of the magnetic heads classified in the second tested head class.

In another general embodiment, a method for a magnetic storage device assembled with one or more magnetic heads includes preparing a substrate for forming a plurality of magnetic heads thereon, forming the plurality of magnetic heads on the substrate, assembling the plurality of magnetic heads into magnetic storage devices, testing at least some of the plurality of magnetic heads to obtain characteristic values, estimating characteristic values of non-tested magnetic heads on which testing is not performed using the characteristic values of the tested magnetic heads, classifying the non-tested magnetic heads based on the estimated characteristic values, assembling the magnetic heads classified as non-tested magnetic heads into the magnetic storage devices according to assembly rules, measuring performance of the magnetic storage devices assembled with the non-tested magnetic heads, and screening the magnetic storage devices assembled with the non-tested magnetic heads.

In another general embodiment, a system includes logic adapted for classifying each of a plurality of magnetic heads into one of: a first tested head class, and a non-test-candidate head class, logic adapted for determining characteristic values of the magnetic heads classified in the first tested head class, logic adapted for estimating characteristic values of the magnetic heads classified in the non-test-candidate head class, wherein the estimating is based on the characteristic values of the magnetic heads classified in the first tested head class, logic adapted for classifying each of the magnetic heads classified in the non-test-candidate head class into one of: a second tested head class, and a non-test head class, wherein the classifying is based on the estimated characteristic values of the magnetic heads classified in the non-test-candidate head class, logic adapted for determining characteristic values of the magnetic heads classified in the second tested head class, and logic adapted for screening magnetic heads in the second tested head class based on the determined characteristic values of the magnetic heads classified in the second tested head class.

In yet another general embodiment, a computer program product may include computer readable medium having computer readable code stored thereon, the computer readable medium including computer readable code adapted for classifying each of a plurality of magnetic heads into one of: a first tested head class, and a non-test-candidate head class, computer readable code adapted for determining characteristic values of the magnetic heads classified in the first tested head class, computer readable code adapted for estimating characteristic values of the magnetic heads classified in the non-test-candidate head class, wherein the estimating is based on the characteristic values of the magnetic heads classified in the first tested head class, computer readable code adapted for classifying each of the magnetic heads classified in the non-test-candidate head class into one of: a second tested head class, and a non-test head class, wherein the classifying is based on the estimated characteristic values of the magnetic heads classified in the non-test-candidate head class, computer readable code adapted for determining characteristic values of the magnetic heads classified in the second tested head class, and computer readable code adapted for screening magnetic heads in the second tested head class based on the determined characteristic values of the magnetic heads classified in the second tested head class.

According to one embodiment, a method is provided for sampling tests that reduces the proportion of defects included among the shipped items under the previously described conditions, and allows this proportion to be controlled.

In more embodiments, the method also includes estimating the test results for all the magnetic heads when sampling tests are performed, thereby making it possible to utilize the magnetic storage device manufacturing methods of Japanese Unexamined Patent Application Publication No. 2009-205774 and Japanese Unexamined Patent Application Publication No. 2009-211758.

To solve the above problems, a magnetic head manufacturing method according to one embodiment includes classifying each of a plurality of magnetic heads into one of a first tested head class, and a non-test-candidate head class; determining characteristic values of the magnetic heads classified in the first tested head class; estimating characteristic values of the magnetic heads classified in the non-test-candidate head class, wherein the estimating is based on the characteristic values of the magnetic heads classified in the first tested head class; classifying each of the magnetic heads classified in the non-test-candidate head class into one of: a second tested head class, and a non-test head class, wherein the classifying is based on the estimated characteristic values of the magnetic heads classified in the non-test-candidate head class; determining characteristic values of the magnetic heads classified in the second tested head class; and screening magnetic heads in the second tested head class based on the determined characteristic values of the magnetic heads classified in the second tested head class.

By applying a magnetic head manufacturing method according to the above described embodiment, it is possible to maintain a low ratio of defective items among the items that are shipped to the assembly plant, even when using sampling tests, making it possible to reduce the investment in test equipment. It is also possible to adjust the ratio of defective items that are included among the items shipped to the assembly plant. Also, even when sampling tests are performed, it is possible to employ magnetic storage device manufacturing techniques that use the magnetic head test results, and it is possible to keep the magnetic storage device failure rate down to a low level. Also, by applying the above described embodiment to a mass manufacturing plant, it is possible to solve the issue of productivity bottlenecks caused by an inadequate number of expensive test devices needed for conventional exhaustive testing when demand increases compared with other times of year (e.g., at the end of the year), thereby making it possible to avoid lost opportunities.

A brief description follows of a magnetic storage device and magnetic head according to one embodiment, and of manufacturing methods thereof.

Figure 2:
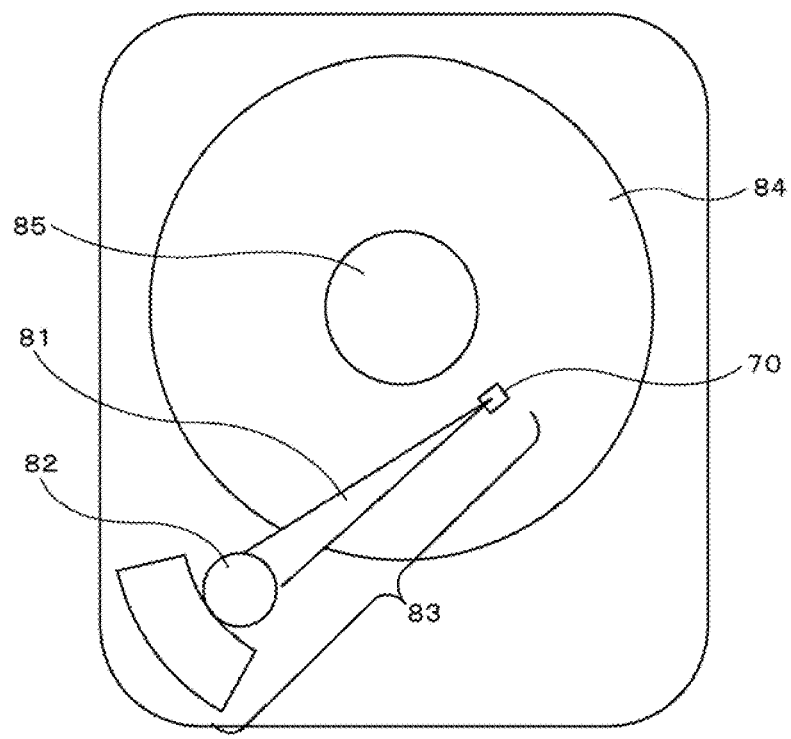
FIG. 2 is a diagram which shows a schematic example of a magnetic storage device, according to one embodiment.

FIG. 2 is an example showing a schematic configuration of a magnetic storage device, where the casing of the magnetic storage device is opened up and seen in plane view from above, according to one embodiment. A magnetic head 70 is fixed to the end of a suspension arm 81 supported by a rotary actuator 82. The writing element and reading element at the tip of magnetic head 70 write and read data to and from a magnetic disk 84 which is rotated by a spindle motor 85. Magnetic head 70, suspension arm 81 and rotary actuator 82 are collectively referred to as head stack assembly 83.

Figure 3:
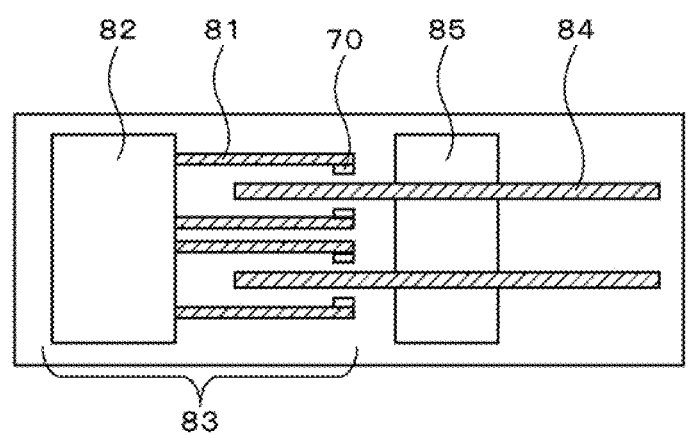
FIG. 3 is a diagram which shows a schematic example of a magnetic storage device, according to one embodiment.

FIG. 3 shows a schematic example of a magnetic storage device, viewed from a side of the magnetic storage device, according to one embodiment. Head stack assembly 83 is furnished with one or more magnetic heads 70 and suspension arms 81 depending on the recording capacity of the magnetic storage device; the illustrated example has a single rotary actuator 82, together with four suspension arms and four magnetic heads. The magnetic storage device also furnished with one or more magnetic disks 84; the illustrated example has two magnetic disks, and records data on both sides thereof.

Figure 4:
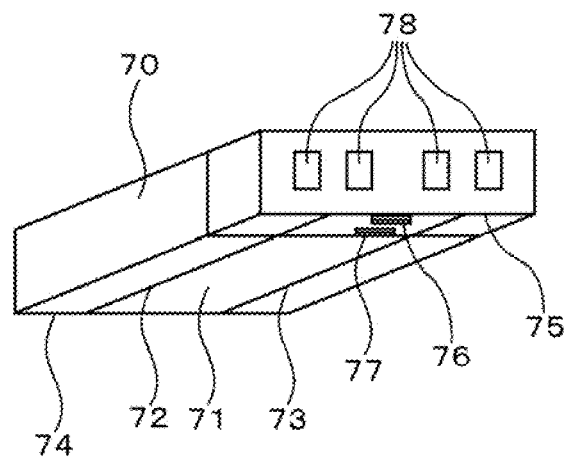
FIG. 4 is a diagram which shows a schematic example of a magnetic head, according to one embodiment.

FIG. 4 is an example showing select parts of a magnetic head, according to one embodiment. Magnetic head 70 is sometimes called a slider. Magnetic head 70 is furnished with rails 72 and 73 in an air bearing surface 71, and when brought into close proximity with the rotating magnetic disk 84, the airflow from air inlet end 74 to air outlet end 75 enables the magnetic head to float above the disk surface. The air outlet end is furnished with a writing element 76 and a reading element 77, and has electrodes 78 for the input/output of data to and from said writing element and reading element.

Figure 5:
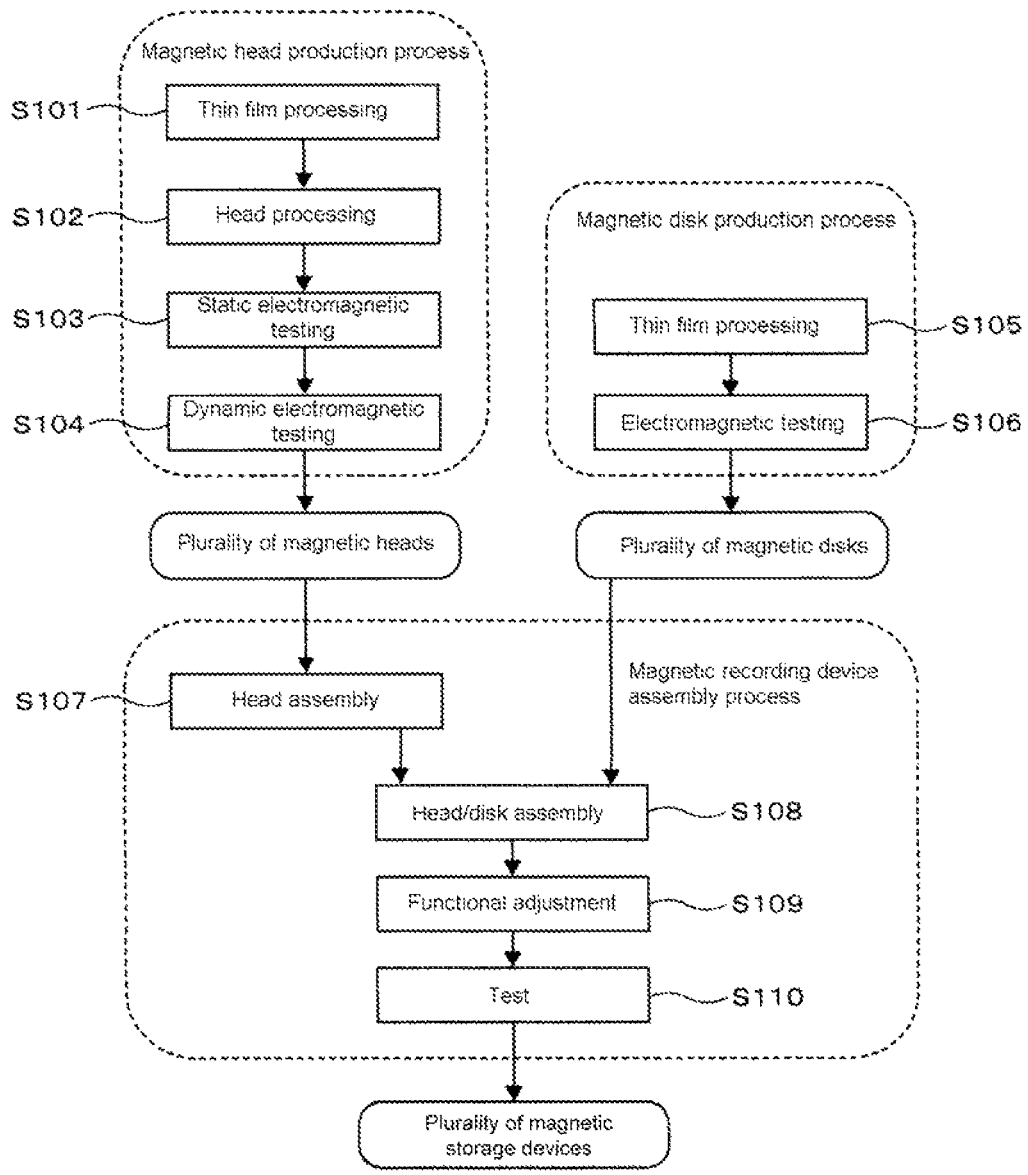
FIG. 5 is a diagram which shows a schematic example of a magnetic storage device manufacturing process, according to one embodiment.

FIG. 5 is an example showing select parts of a manufacturing process starting with the respective manufacturing processes of magnetic head 70 and magnetic disk 84, and ending with the assembly process of the magnetic storage device, according to one embodiment. At step S101, pairs of reading elements and writing elements are formed in large numbers on a substrate (wafer) by a thin film processing technique involving the repetition of steps such as coating, exposure, development, etching and deposition. At step S102, the wafer is cut into long slices called rowbars, and the air bearing surface 71 is formed in rowbar units by a polishing process.

Next, rails 72 and 73 are formed by a combination of coating, exposure, development and etching processes similar to the abovementioned thin film processing. After rails 72 and 73 have been formed, the rowbar is sliced into individual magnetic heads. At step S 103, each magnetic head is subjected to static electromagnetic testing, which mainly involves screening the magnetic heads by measuring the characteristics of their reading elements. The static electromagnetic testing involves bringing the magnetic head into proximity with a magnetic field, and assessing whether or not the reading element can correctly sense the strength of this field and convert it into an electrical signal. Consequently, it is at present virtually impossible to perform static electromagnetic testing in which the characteristic values of the writing element are measured.

Next, at step S104, each magnetic head is subjected to dynamic electromagnetic testing, which mainly involves screening the magnetic heads by measuring the characteristic values of their writing elements. Dynamic electromagnetic testing involves actually floating the magnetic head above a magnetic disk, and assessing whether or not it is possible to write data to the magnetic disk with said writing element and correctly read back this data with the reading element. Since dynamic electromagnetic testing requires that the magnetic head is actually floated above a magnetic disk, expensive test equipment is needed to perform this testing. Although it is also possible to measure the characteristic values of the reading element during dynamic electromagnetic testing, the measurement results depend on the characteristic values of the writing element because the testing involves reading in data written by the writing element. Consequently, the testing generally divided into static electromagnetic testing where the magnetic heads are screened by measuring the characteristic values of the reading elements, and dynamic electromagnetic testing where the magnetic heads are screened by measuring the characteristic values of the writing elements. Magnetic heads that are judged to be of acceptable quality in the screening of step S104 are combined in batches comprising a plurality of magnetic heads, and are sent on to the magnetic storage device assembly process.

Meanwhile, in step S105, the disk is subjected to thin film processing to form a magnetic disk capable of recording data. For a magnetic disk that uses conventional surface recording, this processing basically consists of just film deposition, although advances have recently been made in the development of patterned magnetic disks which are produced using exposure and etching processes similar to those used for the magnetic heads.

At step S106, the magnetic disks are screened by performing electromagnetic testing. Magnetic disks that are judged to be of acceptable quality in the screening of step S106 are combined in batches comprising a plurality of magnetic disks, and are sent on to the magnetic storage device assembly process.

At step S107, the head stack assembly 83 is assembled. Here, as disclosed in Unexamined Patent Application Publication No. 2009-205774 and Unexamined Patent Application Publication No. 2009-211758, performing the assembly while taking into consideration the combination of magnetic heads based on the results of electromagnetic testing in step S103 and step S104, it is possible to maintain a high ratio of magnetic storage devices that are of acceptable quality.

At step S108, parts including head stack assembly 83, magnetic disk 84 and spindle motor 85 are mounted in the device casing. Similarly, it is also possible at this point to maintain a high ratio of magnetic storage devices that are of acceptable quality by performing the assembly while taking into consideration the combination of magnetic heads and magnetic disks.

At step S109, a servo signal used for positioning the magnetic head is written onto magnetic disk 84, and various parameters of the magnetic storage device are adjusted based on factors such as the magnetic write width (MWW) of the magnetic head and the amount of fluctuation that occurs when the magnetic disk is rotated by the spindle motor.

At step S110, the magnetic storage devices are tested and screened. Magnetic storage devices that are judged to be of acceptable quality at step S110 are shipped.

Figure 6:
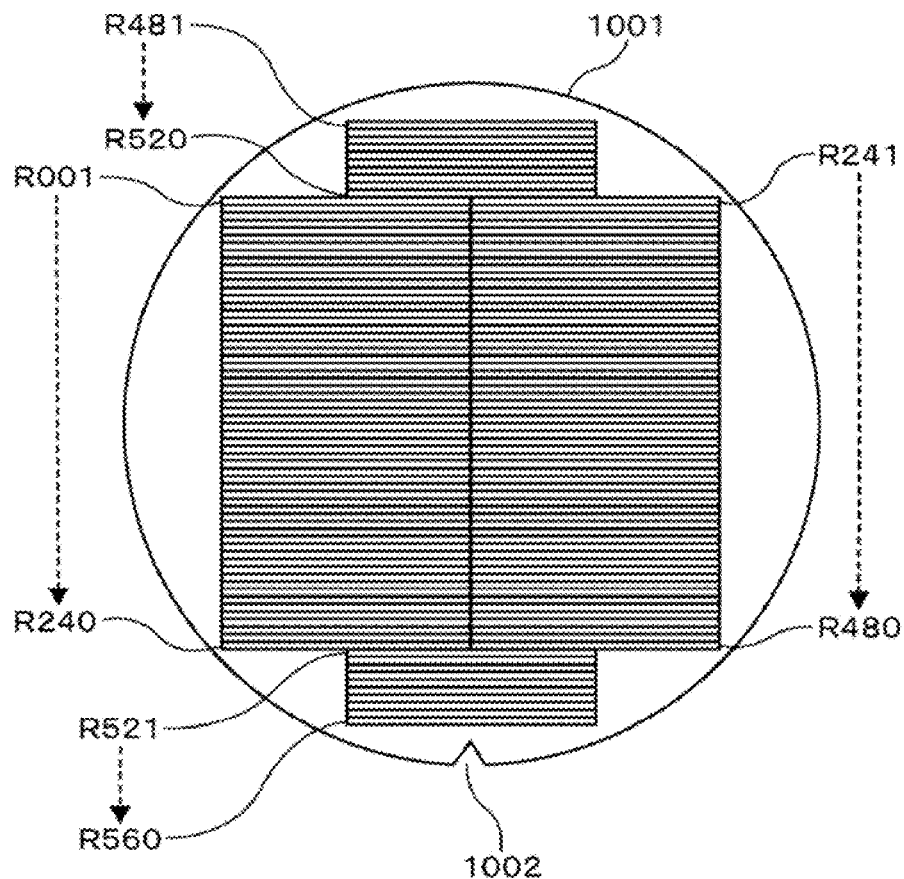
FIG. 6 is a diagram which shows a schematic example of a wafer, according to one embodiment.

FIG. 6 is an example showing select parts of a wafer in which a large number of magnetic heads have been formed, according to one embodiment. The round border 1001 represents the wafer. The wafer has a notch 1002 that acts as a reference point to define coordinate positions on the wafer surface. A large number of slender rectangular rowbars are formed in the wafer surface. Each rowbar is given a serial number based on its coordinates on the wafer. In the illustrated example, 560 rowbars are formed in the surface of a single wafer, and these are given serial numbers ranging from R001 to R560.

Figure 7:
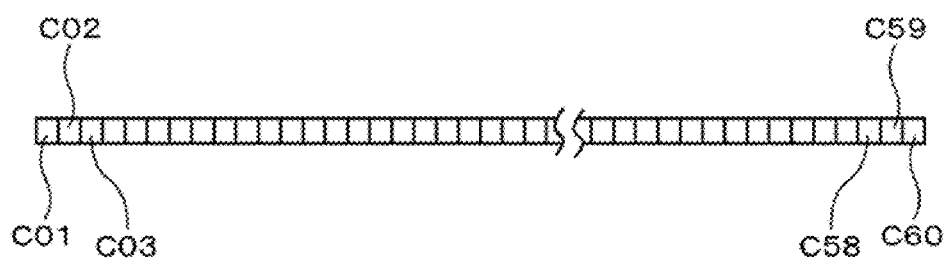
FIG. 7 is a diagram which shows a schematic example of a rowbar, according to one embodiment.

FIG. 7 is an example showing select parts of a rowbar indicated by R001 through R560, according to one embodiment. A large number of magnetic heads are formed in the slender rowbar. In the illustrated example, 60 magnetic heads are formed in a single rowbar, and these are given serial numbers ranging from C01 to C60. In other words, a numbering system is used so that the coordinates of a magnetic head formed on the wafer surface can be understood at a glance based on the serial number of the rowbar on the wafer surface and the serial number of the magnetic head within the rowbar. By assigning serial numbers to wafers, the rowbars on these wafers and the magnetic heads within these rowbars, all the manufactured magnetic heads can be managed based on their own individual serial numbers.

Next, a magnetic head testing method relating to one embodiment is described with reference to FIG. I. FIG. 1 is an example of a procedure for static electromagnetic testing and dynamic electromagnetic testing of magnetic heads, according to one embodiment. At static electromagnetic testing step S103, the characteristic values of the reading element are first measured at step S200. The characteristic values of playback head 77 include the resistance of the reading element (MRDCR), the amplitude of the voltage output from terminals 78 due to a magnetic field received by the reading element (AMP), and the asymmetry of this voltage (ASYM).

Next, at step S300, the magnetic heads are classified into scrap, tested heads and non-test-candidate heads based on the measured values, criteria and sampling rule of the dynamic electromagnetic test. Next, the tested heads and non-test-candidate heads are passed on to dynamic electromagnetic testing step S104.

In dynamic electromagnetic testing step S104, the writing element characteristic values of the magnetic heads classified as tested heads in step S300 are first measured in step S400. The characteristic values of the writing elements are the results of analyzing the signal output from electrodes 78 after writing a signal onto a magnetic disk twice with the writing element and then reading back this signal with the reading element. Specifically, these values include the mean width of the second signal waveform (MWW), the width of the upper part of the signal waveform (SQZ), and the amplitude ratio of the second signal and the remains of the first signal after it has been overwritten by the second signal (OW). This amplitude ratio is expressed in decibels by taking the logarithm of the two values and multiplying the result by 20.

At step S500, the measured writing element characteristic values are compared with criteria and the tested head is classified either as scrap or as belonging to one of the pass categories Pass-A or Pass-B. Meanwhile, at step S600, the characteristic values of the tested head measured at step S400 are used to estimate the characteristic values of the writing elements in the non-test-candidate category.

At step S700, the characteristic values of writing elements estimated for non-test-candidate heads are compared with criteria for estimation, and are classified either as tested heads or as belonging to one of the pass categories Pass-C and Pass-D. At step S401, the characteristic values of the writing elements of the tested heads are measured by the same method as in step S400. At step S501, the tested heads are classified either as scrap or as belonging to one of the pass categories Pass-A and Pass-B by the same method as in step S500.

The heads classified into pass categories Pass-A, Pass-B, Pass-C and Pass-D by the above procedure are each sent to the assembly plant. That is, the magnetic heads of acceptable quality are shipped to the assembly plant. Although the acceptable parts are classified into four categories A, B, C and D in this example, the present invention is not limited to such a classification. Although the magnetic heads whose characteristic values have actually been measured are classified into categories Pass-A and Pass-B, and the magnetic heads whose characteristic values have only been estimated are classified into categories Pass-C and Pass-D, it is also possible to combine the Pass-C category with Pass-A, and to combine the Pass-D category with Pass-B.

Figure 8:
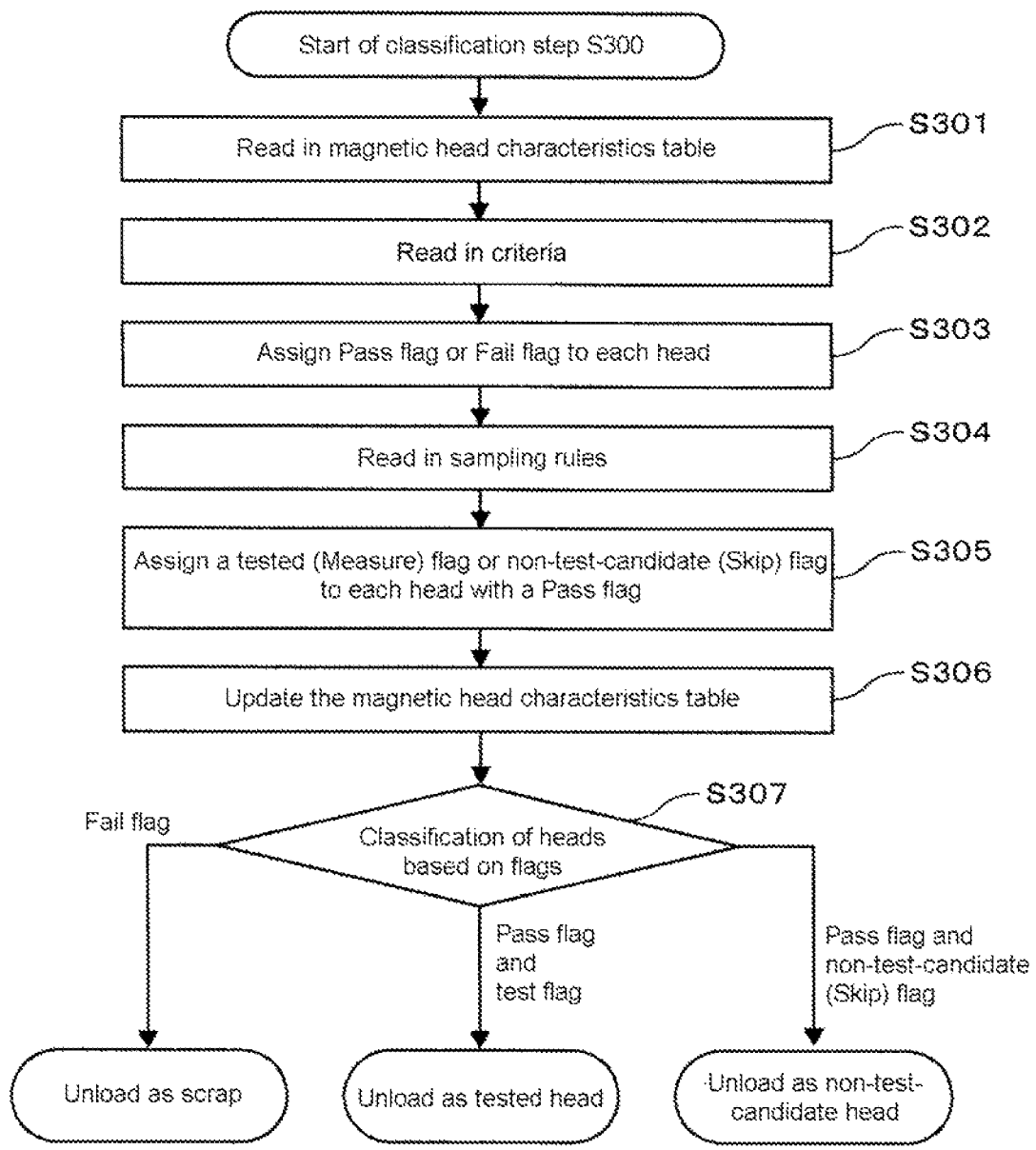
FIG. 8 is a diagram which shows the procedure of classification step S300, according to one embodiment.

FIG. 8 is an example of a detailed procedure for step S300, according to one embodiment. In step S300, the magnetic heads are classified into scrap, tested heads and non-test-candidate heads based on the measured values, criteria and the sampling rules of the dynamic electromagnetic testing. First, at step S301, a magnetic head characteristics table 1010 in which the characteristic values of reading elements measured at step S200 are recorded is read in, and at step S302, the criteria 1020 are read in. At step S303, the measured values of the reading element read in at step S301 for each magnetic head are compared with the criteria read in at step S302, the magnetic heads are judged to be either of acceptable quality (Pass) or unacceptable (Fail), and the judgment results are written to the magnetic head characteristics table. At step S304, the sampling rules 1030 for dynamic electromagnetic testing are read in. At step S305, the magnetic heads judged to be of acceptable quality at step S303 are classified as tested heads or non-test-candidate heads, and the classification results are written to the magnetic head characteristics table. At step S306, based on the magnetic head characteristics table, the magnetic heads are classified either as scrap or as belonging to the tested head or non-test-candidate head category, and are unloaded.

Figure 9:
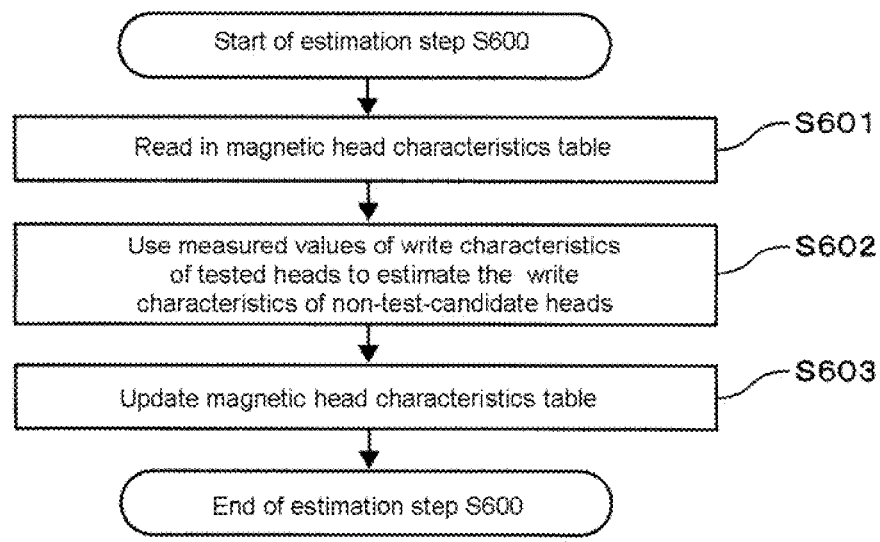
FIG. 9 is a diagram which shows the procedure of estimation step S600, according to one embodiment.

FIG. 9 is an example of a detailed procedure for step S600, according to one embodiment. At step S601, the magnetic head characteristics table 1011 that was updated at step S300 is read in. Next, at step S602, from the characteristic values of the writing elements measured from the tested heads, the characteristic values of the writing elements of the non-test-candidate heads are estimated by (Formula 1) or by a combination of (Formula 2) and (Formula 3). When using (Formula 1), for magnetic heads situated at locations and $C_i$ and $C_j$ on the same rowbar (where $C_i$ is a rowbar coordinate representing the i-th position, $C_j$ represents the j-th position, and $i \neq j$), the measured characteristic values $m(C_i)$ and $m(C_j)$ (where $m(C_i)$ and $m(C_j)$ are the characteristic values measured at positions $C_i$ and $C_j$ on the rowbar, respectively) are linearly interpolated to estimate the characteristic values of the magnetic head located at $C_i$ (representing the position on the rowbar).

On the other hand, when using the combination of (Formula 2) and (Formula 3), a profile 1080 consisting of the average or median values of the characteristic values at each wafer coordinate position obtained from large numbers of magnetic heads that have been produced in the past is used to calculate the respective differences between the characteristic values of, magnetic heads on the same rowbar that were actually measured and the values for magnetic heads at the same positions that are measured from profile 1080, and the characteristic values are estimated as the result of adding the values at position $C_i$ from profile 1080 to the median value of the difference. Next, at step S603, the estimated characteristic values are written to the magnetic head characteristics table. Although the example shown here describes an implementation where the characteristic values of the writing, elements of non-test-candidate magnetic heads are estimated by (Formula 1) or by the combination of (Formula 2) and (Formula 3), the present invention is not limited to these systems. For example, it is also possible to use a system where all the measured characteristic values of magnetic heads on the same rowbar are approximated using an approximation curve such as a spline curve. However, as a result of tests performed by the inventors, it has been found that when there are many magnetic heads judged to be defective on the same rowbar at step S300, the accuracy of a spline curve for the characteristic values of non-test-candidate heads is significantly diminished, so spline curves are not recommended.

$$p(C_t) = \frac{(C_j - C_t) \cdot m(C_i) + (C_t - C_i) \cdot m(C_j)}{C_j - C_i} \quad \text{Formula 1}$$

$$p(C_t) = prof(C_t) + \text{median}(DIF) \quad \text{Formula 2}$$

$$DIF = \begin{bmatrix} m(C_i) - prof(C_i) \\ m(C_j) - prof(C_j) \\ \vdots \\ m(C_k) - prof(C_k) \end{bmatrix} \quad \text{Formula 3}$$

Figure 10:
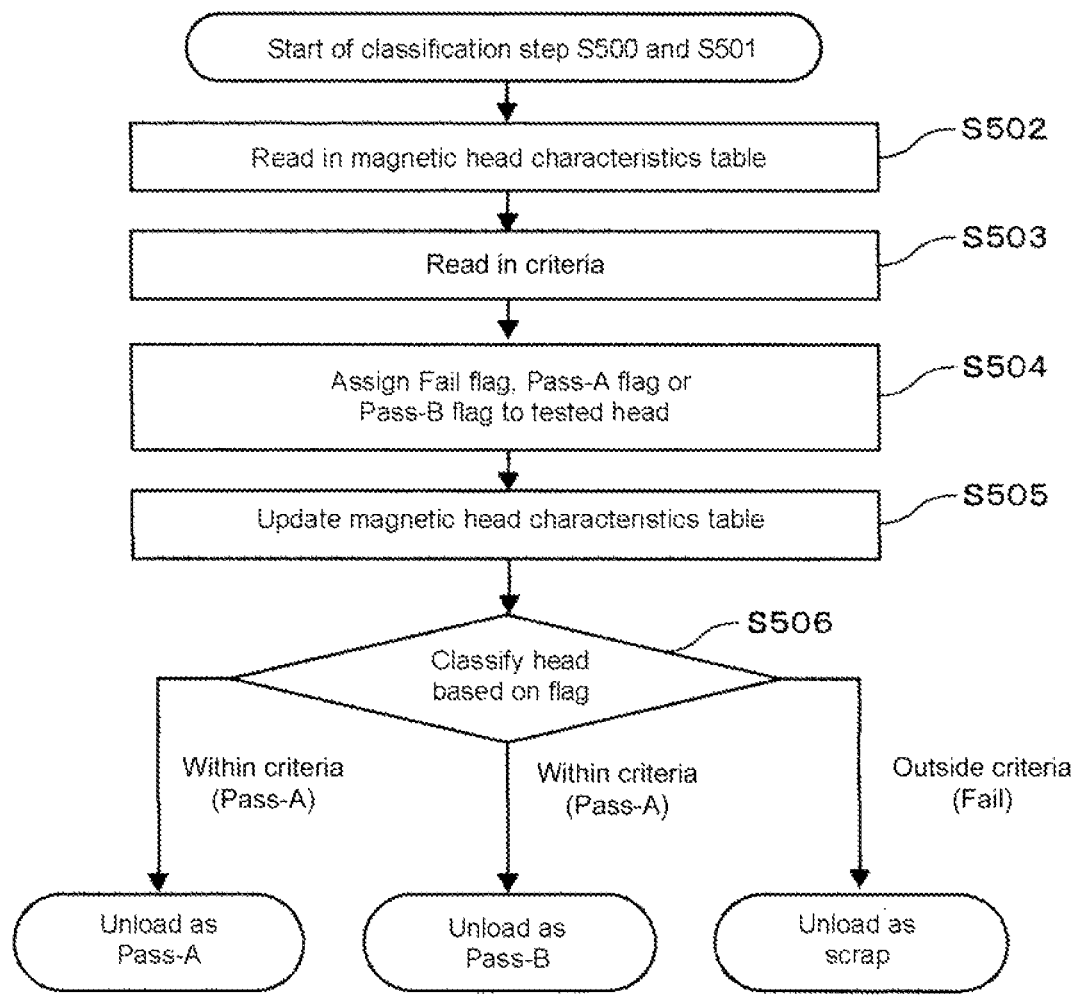
FIG. 10 is a diagram which shows the procedure of classification steps S500 and S501, according to one embodiment.

FIG. 10 is an example of a detailed procedure for steps S500 and S501, according to one embodiment. S500 and S501 may be the same procedure, according to one embodiment. First, at step S502, the magnetic head characteristics table is read in, and at step 5503, the criteria 1051 are read in. Next, at step S504, for the tested heads, the characteristic values recorded in the magnetic head characteristics table are compared with the criteria written at step S503, and are assigned one of the following flags: Fail, Pass-A or Pass-B. At step S505, the flagged magnetic head characteristics table is updated and registered. At step S506, based on the applied flags, the magnetic heads are each categorized as defective heads or as belonging to the Pass-A or Pass-B category, and are unloaded.

Figures 11, 12:
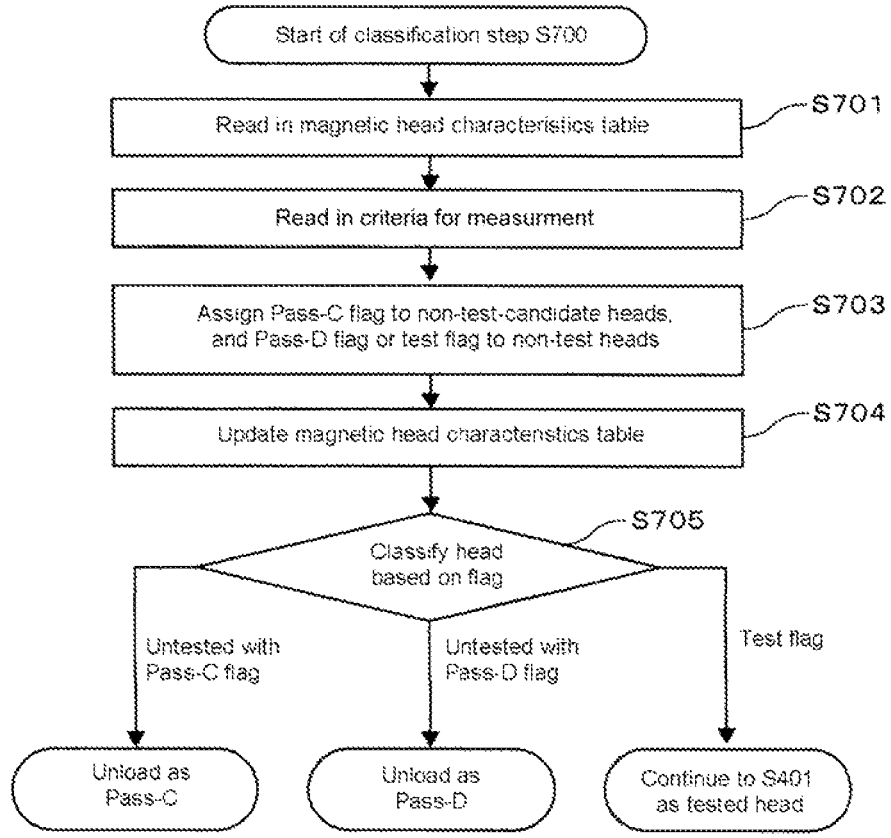
FIG. 11 is a diagram which shows the procedure of classification step S700, according to one embodiment.
FIG. 12 is a diagram which shows examples of criteria for static electromagnetic tests, according to one embodiment.

FIG. 11 is an example showing a detailed procedure for step S700, according to one embodiment. First, at step S701, the magnetic head characteristics table is read in and, at step S702, the estimation criteria 1051 are read in. These criteria are made stricter than the criteria 1050 used at step S602 so as to prevent heads that are judged as being of acceptable quality after having been originally classified as defective, taking estimation errors into consideration. At step S703, the estimated characteristic values stated in the magnetic head characteristics table are compared with the estimated criteria 1051, and a tested (Measure) flag is applied to non-test-candidate heads, consisting of either a Pass-C flag or a Pass-D flag. At step S704, the flagged magnetic head characteristics table is updated and registered. At step S705, based on the applied flags, each magnetic head is classified as Pass-C, Pass-B or as a tested head, and the magnetic heads classed as Pass-C or Pass-D are unloaded, while step S401 is performed to measure the writing element characteristics of the tested heads.

FIG. 12 is an example of criteria of the playback reading element characteristics, according to one embodiment. In 1020, criteria are defined for the purpose of judging heads to be of acceptable quality based on three characteristic values of the reading elements—the resistance of the reading element (MRDCR), the amplitude of the voltage output from terminals 78 due to a magnetic field received by the playback element (AMP), and the asymmetry of this voltage (ASYM). In the example illustrated, this means that a head is classified as being of acceptable quality if MRDCR ranges from 300 or more to less than 1000, AMP ranges from 5000 or more to less than 20000, and ASYM ranges from −10 or more to less than 10, and is classified as a defective head if any parameter falls outside these ranges.

FIG. 13 is an example of a sampling rule for dynamic, electromagnetic testing, according to one embodiment. In 1030, the first column is the item name, the second column is the data, and the items Measure and Skip represent the frequency of tested (Measure) flags and non-test-candidate (Skip) flats. In the illustrated example, this means that since there is one Measure item and three Skip items, the tested (Measure) flag is applied to a single magnetic head, and non-test-candidate (Skip) flags are applied to the next three magnetic heads. If the Start item is 0, then a search is performed in sequence starting from C01, and a tested (Measure) flag is applied to the first magnetic head that has a Pass flag applied to it; if it is 1, then a tested (Measure) flag is applied to the second magnetic head that has a Pass flag applied to it, counting from C01; and if it is 2, then a tested (Measure) flag is applied to the third magnetic head that has a Pass flag applied to it, counting from C01. In this way, the Start item specifies the first magnetic head to which a tested (Measure) flag is applied, searching in sequence from C01. If the End item is 1, then a reverse search is performed from C60, and a tested (Measure) flag is applied to the first magnetic head that has a Pass flag applied to it, regardless of the other items; if it is 0, then tested (Measure) flags are applied based solely on the Measurement Skip and Start items. The magnetic head characteristics table 1011 contains the results of applying tested (Measure) flags and non-test-candidate (Skip) flags according to the illustrated sampling rules 1030.

FIG. 14 is an example of the criteria of the writing element characteristics, according to one embodiment. In 1050, criteria are defined for identifying heads of acceptable quality by writing a signal waveform twice with the writing element and measuring three characteristic values of the writing element—the mean width of the second signal waveform (MWW), the width of the upper part of the second signal waveform (SQZ), and the amplitude ratio of the first and second signals (OW). In the example illustrated, this means that the head is classified as Pass-A if MWW from 110 or more to less than 120, SQZ ranges from 0 or more to less than 20, and OW ranges from 25 or more, the head is classified as Pass-B if MWW ranges from 120 or more to less than 130, SQZ ranges from 0 or more to less than 20, and OW ranges from 25 or more, and the head is classified as defective if it is classified into neither of categories Pass-A and Pass-B.

FIG. 15 is an example of the criteria used for estimating the writing element characteristics, according to one embodiment. In 1051, criteria are defined for judging which magnetic heads are of acceptable quality with regard to three characteristic values of the writing element—MWW, SQZ and OW. In the example illustrated, this means that the head is classified as Pass-C if MWW ranges from 115 or more to less than 120, SQZ ranges from 0 or more to less than 18, and OW ranges from 30 or more, the head is classified as Pass-D if MWW ranges from 120 or more to less than 125, SQZ ranges from 0 or more to less than 18, and OW ranges from 30 or more, and the head is classified as a tested head if it is classified into neither categories Pass-C or Pass-D. The criteria for estimation in table 1051 are set more strictly than the criteria in table 1050, taking estimation errors into consideration.

FIGS. 16-20 show examples of the magnetic head characteristics table for each rowbar level, according to various embodiments. The data for each element that is written to these magnetic head characteristics tables or read from these tables (measured values, judgment results, etc.) is retrieved using various serial numbers as a search key—the wafer serial number, the serial number of the rowbar on the wafer surface, and the serial number of the position within the rowbar.

Figure 16:
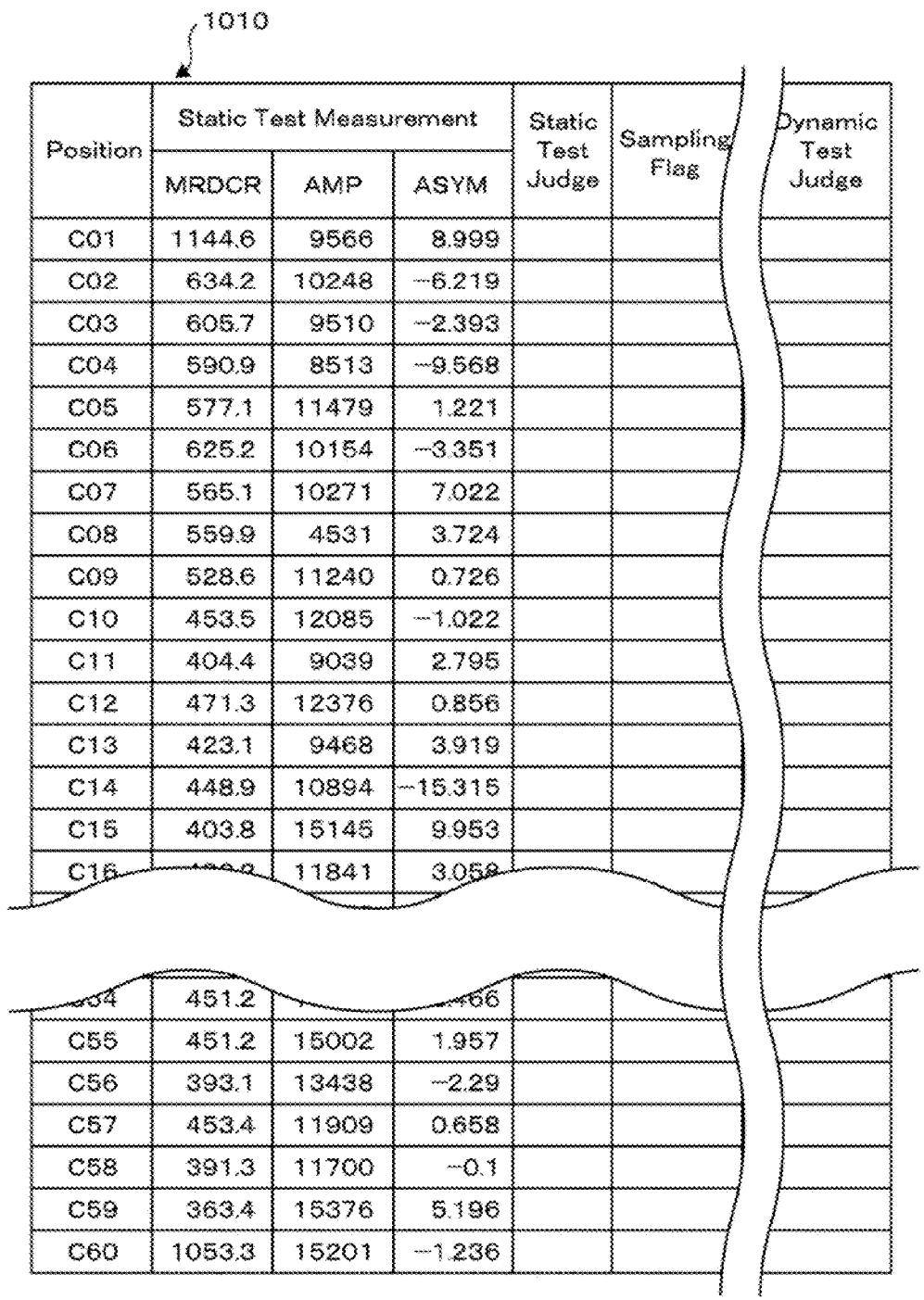
FIG. 16 is a diagram which shows an example of a magnetic head characteristics table, according to one embodiment.

FIG. 16 is an example of a magnetic head characteristics table in the state after step S200 has been completed and when it is read in at step S301, according to one embodiment. The magnetic head characteristics table has one table for each rowbar, and each row represents a position in the rowbar, i.e., from C01 to C60. The first column is the position in the rowbar, and the second through fourth columns are the characteristic values of the reading element as measured at step 200. Although there are three types of characteristic values in the example shown, the present invention is not limited to this number, and in general there may be dozens of such values. The fifth and higher columns are left empty for writing at step 5301.

Figure 17:
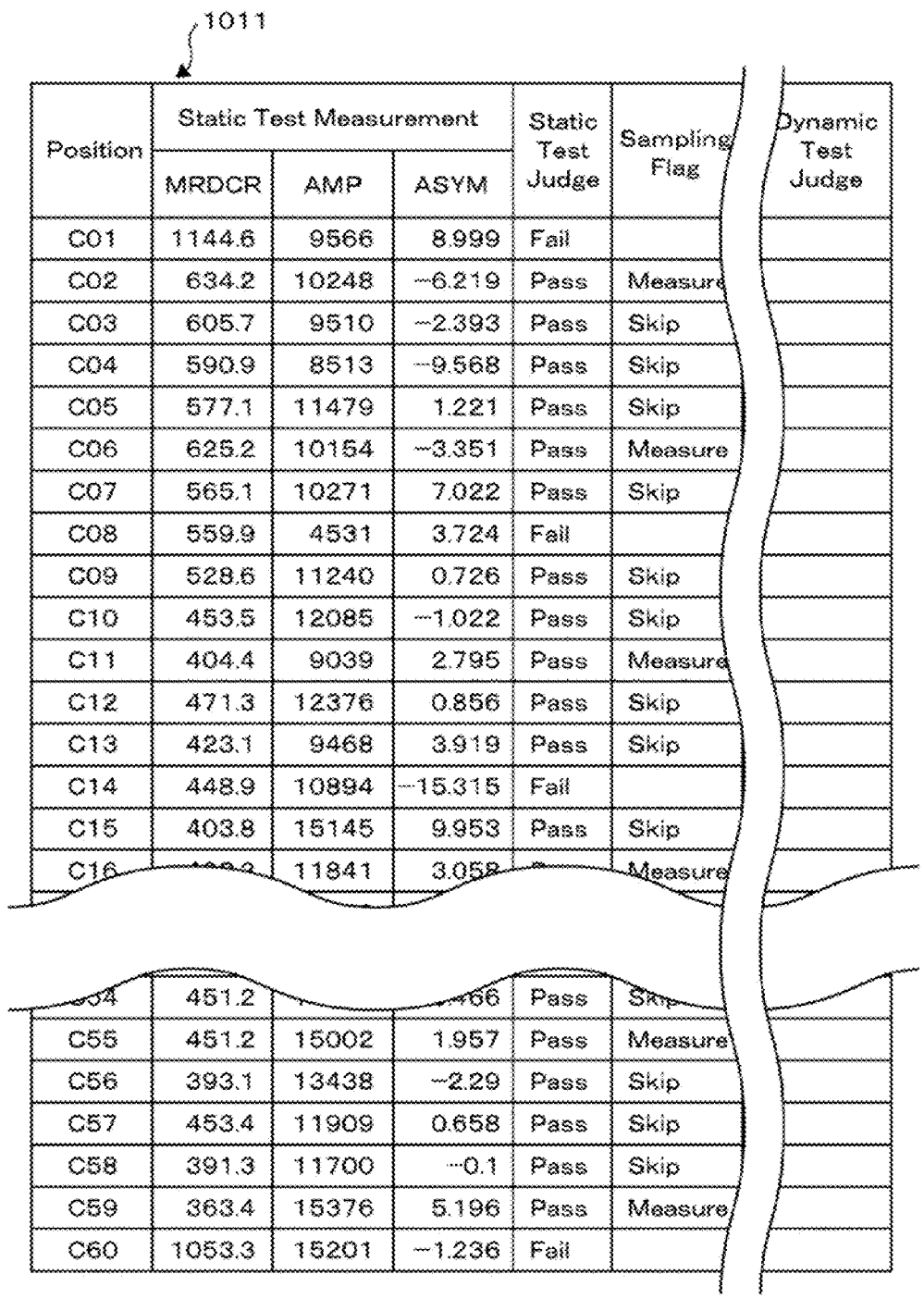
FIG. 17 is a diagram which shows an example of a magnetic head characteristics table, according to one embodiment.

FIG. 17 is an example of a magnetic head characteristics table in the state after it has been updated and registered at step S306, according to one embodiment. Magnetic head characteristics table 1011 is filled with the flags applied to the fifth and 6th columns of table 1010. The fifth column is filled with the Pass or Fail flags applied at step S303. Specifically, the characteristic values of the reading element in the second through fourth columns are compared with the criteria 1020, and if all three types of characteristic value are within the criteria then it is filled with a Pass flag, otherwise if any of the three characteristic values are outside the criteria then it is filled with a Fail flag. The 6th column is filled with the tested (Measure) flags or non-test-candidate (Skip) flags applied at step S305. Specifically, based on sampling rules 1030, the fifth column is filled with a tested (Measure) flag or non-test-candidate (Skip) flag in rows to which a Pass flag has been applied in the fifth column, and is left unfilled in rows to which a Fail flag has been applied in the fifth column.

FIG. 18 is an example of a magnetic head characteristics table in the state after the characteristic values of the writing element have been measured at step S400, and when it is read in at step S601, according to one embodiment. The fifth column from the right end of magnetic head characteristics table 1012 corresponds to the 6th column from the left of magnetic head characteristics table 1011. In the rows of magnetic head characteristics table 1012 where a tested head (Measure) flag is applied in the fifth column from the right, the measurement results of step S400 are entered with MWW in the fourth column from the right, SQZ in the third column from the right, and OW in the second column from the right.

FIG. 19 is an example of a magnetic head characteristics table in the state after the tested heads have completed step S500 and the non-test-candidate heads have completed step S700, according to one embodiment. Magnetic head characteristics table 1013 is filled with the characteristic values estimated using (Formula 1) based on the fourth, third and second columns from the right of 1012 in rows where a non-test-candidate head (Skip) flag is applied in the fifth column from the right. For example, the MWW characteristic value of a magnetic head at position C03 is calculated from the MWW of C02 and the MWW of C06 by evaluating $((6-3) \times 133.26 + (3-2) \times 134.11) \div (6-2)$, resulting in a value of 133.473. Also, the rightmost column is filled with a flag obtained by comparing the characteristic values with criteria 1050 or criteria 1051. Specifically, the Fail flag, Pass-A flag or Pass-B flag applied at step S504 is entered in rows where a tested head (Measure) flag is applied, and the Pass-C flag, Pass-D flag or Measure flag applied at step S703 is entered in rows where a non-test-candidate (Skip) flag is applied.

FIG. 20 is an example of a magnetic head characteristics table in the state after completing step S501, according to one embodiment. In magnetic head characteristics table 1014, for magnetic heads to which a tested head (Measure) flag has been applied at step 703, the results of measuring the characteristics of the writing element at step S401 are written over the predicted values, the overwritten characteristic values are compared with the criteria 1050 shown in FIG. 14, and the rightmost column is filled with either a Fail flag, a Pass-A flag or a Pass-B flag which replaces the tested head (Measure) flag. For example, the MWW of magnetic head position C03 in magnetic head characteristics table 1013 has been entered as an estimated value of 133.473, but in magnetic head characteristics table 1014, this is overwritten with the value of 132.11 measured at step S401. Also, the rightmost column for magnetic head position C03 in magnetic head characteristics table 1013 has been filled with a tested head (Measure) flag, but in magnetic head characteristics table 1014, this is overwritten with a Fail flag as the classification result of step S501.

Figure 21:
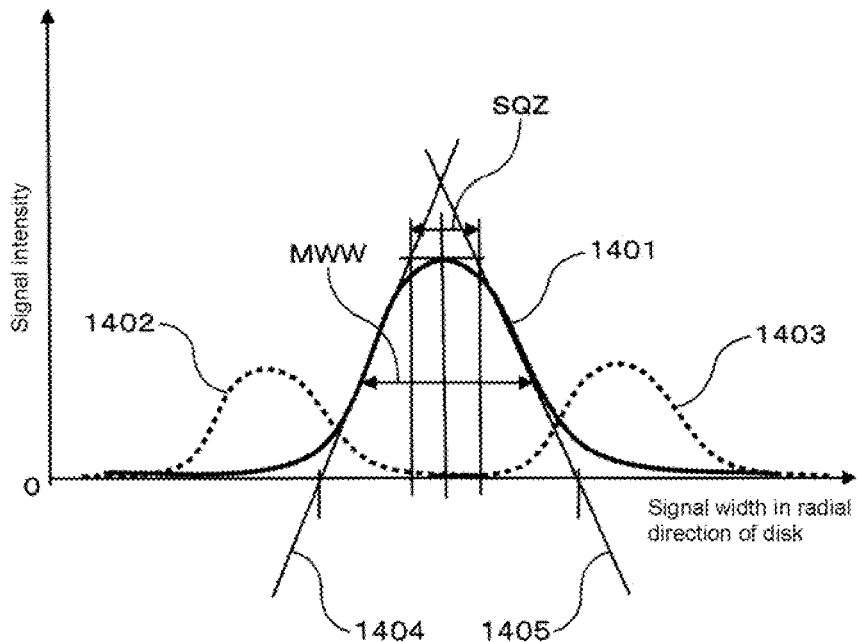
FIG. 21 is a diagram which shows an example of a waveform signal to explain the characteristic values of the writing element, according to one embodiment.

FIG. 21 is an example of a measurement method for the characteristic values of a writing element, according to one embodiment. The vertical axis represents the strength (voltage) of the signal waveform, the horizontal axis represents the signal amplitude in the radial direction of the magnetic disk, the thick solid curve 1401 represents the signal waveform written the second time by the writing element, and the dotted curves 1402 and 1403 represent the state where the peaks of the signal waveform written the first time by the writing element are diminished when writing to the disk the second time. MWW is the result of measuring the width of the signal between the points where curve 1401 passes through an intensity equal to half the peak value. SQZ is the result of measuring the distance between lines 1404 and 1405 at the peak amplitude of the waveform, where these lines are tangential to curve 1401 at the half-height points. OW is the value obtained by taking the logarithm of the ratio of the height of curve 1401 and the average value of the height of curves 1402 and 1403, and multiplying the result by 20.

Figure 22:
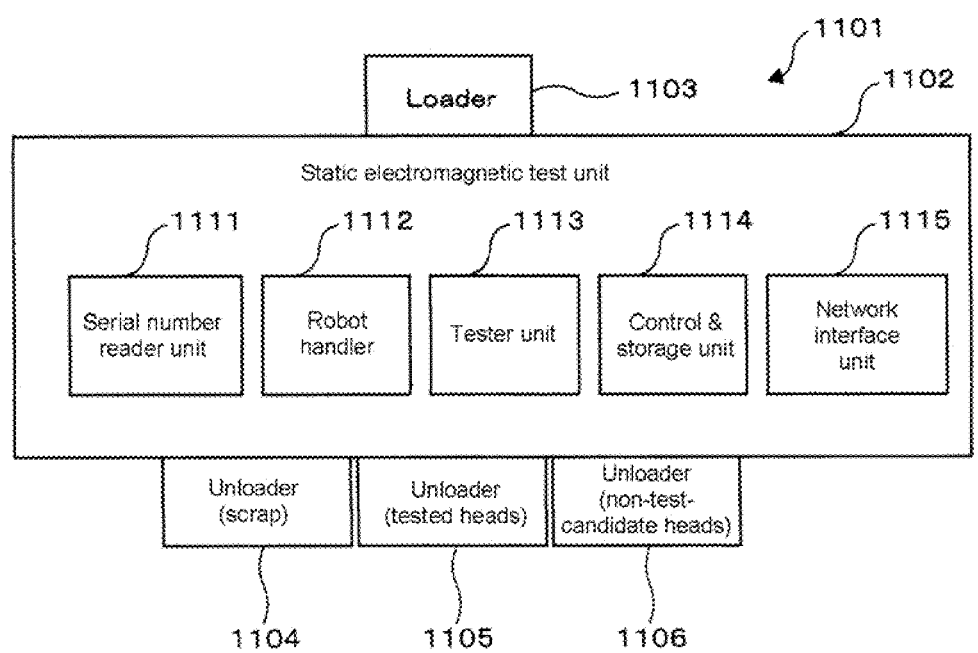
FIG. 22 is a diagram which shows an example of a static electromagnetic test device, according to one embodiment.

FIG. 22 is a schematic example of a static electromagnetic test device, according to one embodiment. Static electromagnetic test device 1101 comprises a static electromagnetic test unit 1102, a loader 1103 that loads a plurality of magnetic heads that have been processed at step S102, and unloaders 1104, 1105 and 1106 that unload the magnetic heads classified at step S300. Static electromagnetic test unit 1102 comprises a serial number reader unit 1111 that optically reads in magnetic head serial numbers (i.e., serial numbers consisting of the combination of a wafer serial number, the serial number of a rowbar on the wafer surface, and the serial number of a position in the rowbar), a robot handler 1112 that moves magnetic heads from a loader 1103 to a serial number reader unit and tester unit, and moves the magnetic heads from the tester unit to unloaders 1104, 1105 and 1106, a tester unit 1113 that measures the characteristic values of the reading elements of the magnetic heads, a control and storage unit 1114 that controls the static electromagnetic test device and its component parts, stores the characteristic values measured by this device, and performs the classification processing of step S300, and a network interface unit 1115 that transmits and receives data to and from a database device and other devices via a local area network 1301.

Figure 23:
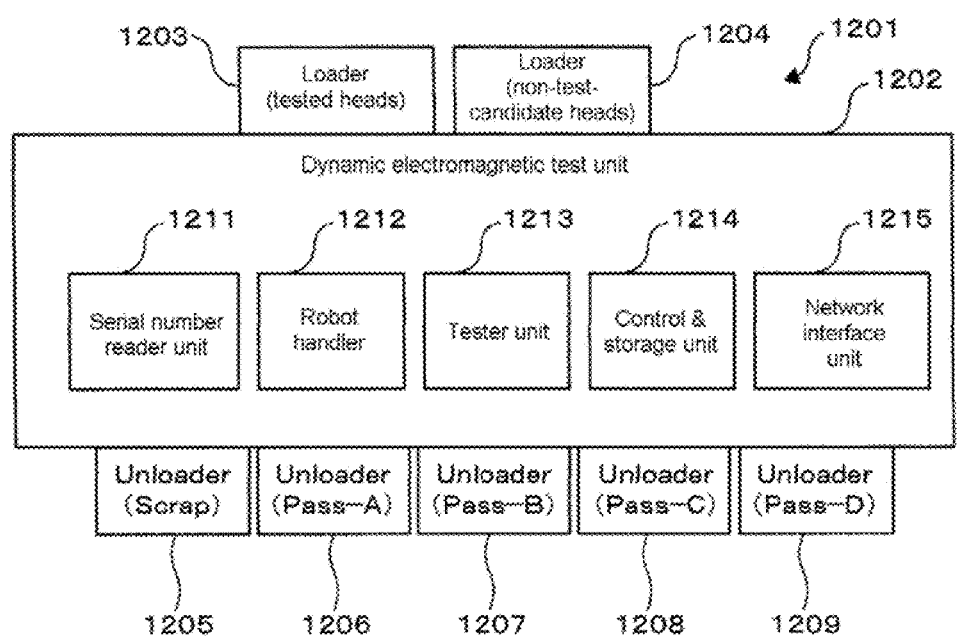
FIG. 23 is a diagram which shows an example of a dynamic electromagnetic test device, according to one embodiment.

FIG. 23 is a schematic example of a dynamic electromagnetic test device, according to one embodiment. Dynamic electromagnetic test device 1201 comprises a dynamic electromagnetic test unit 1202, a loader 1203 that loads a plurality of magnetic heads that were classified as tested heads at step S300, a loader 1204 that loads a plurality of magnetic heads that were classified as non-test-candidate heads at step 5300, and unloaders 1205, 1206, 1207, 1208 and 1209 that unload the magnetic heads after they have been classified at step S500, step S501 and step S700. Dynamic electromagnetic test unit 1202 comprises a serial number reader unit 1211 that optically reads in magnetic head serial numbers (i.e., serial numbers consisting of the combination of a wafer serial number, the serial number of a rowbar on the wafer surface, and the serial number of a position in the rowbar), a robot handler 1212 that moves magnetic heads from loaders 1203 and 1204 to a serial number reader unit and tester unit, and moves the magnetic heads from the tester unit to unloaders 1205, 1206, 1207, 1208 and 1209, a tester unit 1213 that measures the characteristic values of the writing. elements of the magnetic heads, a control & storage unit 1214 that controls the dynamic electromagnetic test device and its component parts, stores the characteristic values measured by this device, performs the classification processing of step S500, step S700 and step 5501, and estimates the characteristic values of the non-test-candidate heads at step S600, and a network interface unit 1215 that transmits and receives data to and from a database device and other devices via local area network 1301. In dynamic electromagnetic test device 1201, robot handler 1212 individually holds the plurality of magnetic heads set in loader 1203, their serial numbers are read by serial number reader unit 1211, and their characteristic values are measured by tester unit 1213. Specifically, it performs step S400 on the plurality of magnetic head set in loader 1203. The plurality of magnetic heads set in loader 1204 are held one at a time by robot handler 1212 after the characteristic values of the plurality of heads set in loader 1203 have been measured, and they are classified by reading their serial numbers with serial number reader unit 1211. The magnetic heads that are classified as Pass-C or Pass-D at step S700 are sent on to unloader 1207 or 1208 without going via tester unit 1213. Consequently, it is possible to produce magnetic heads with a smaller number of dynamic electromagnetic test devices while dramatically reducing the test time.

As shown in FIGS. 22 and 23, the processing steps shown in FIG. 1 are implemented by using a system including control and storage units 1114 and 1214 to manage a database (for example, the magnetic head tables shown in FIGS. 16-20), and by using this database for the classification of magnetic heads at each processing step, according to one embodiment. a17

Figure 24:
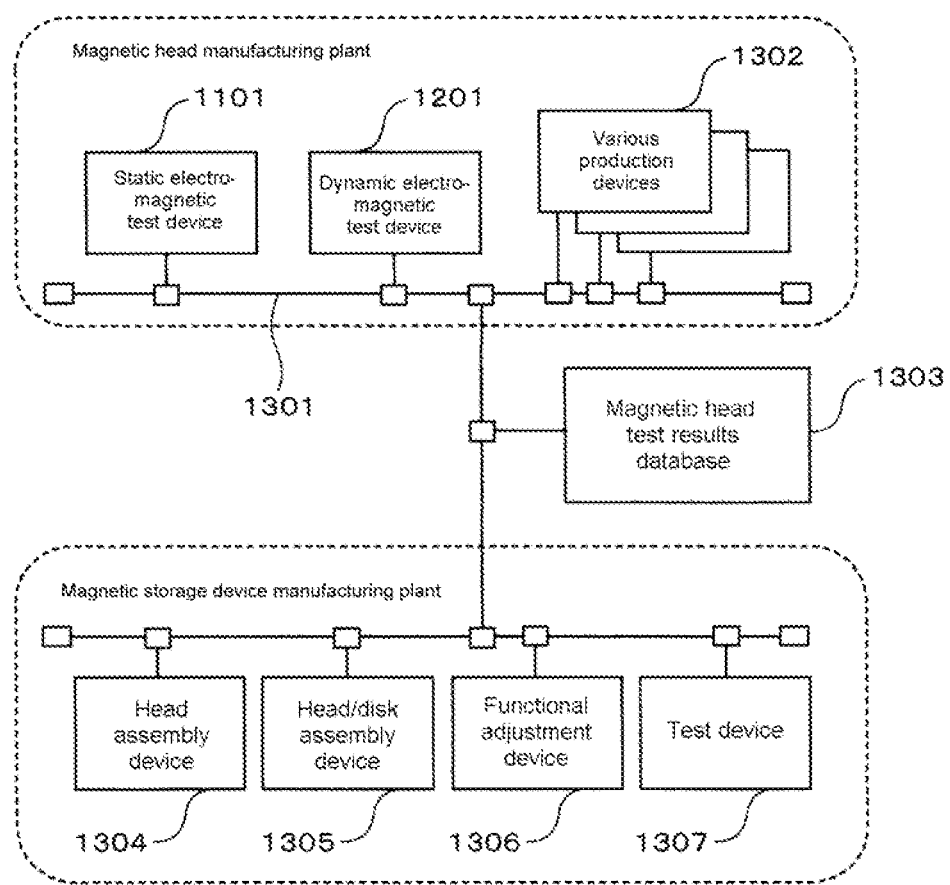
FIG. 24 is a diagram which shows an example of a hardware configuration, according to one embodiment.

FIG. 24 is a schematic example of a hardware configuration, according to one embodiment. A static electromagnetic test device 1101, dynamic electromagnetic test device 1201 and various manufacturing devices 1302 are installed at the magnetic head manufacturing plant, and are connected together via a local area network 1301. Also, a head assembly device 1304, head disk assembly device 1305, function adjustment device 1306 and test device 1307 are installed at the magnetic storage device assembly plant, and are connected to each other via a local area network 1301. The magnetic head characteristic values measured by static electromagnetic test device 1101 and the characteristic values of magnetic heads estimated and calculated by dynamic electromagnetic test device 1201 are stored in magnetic head test results database device 1303 via local area network 1301. Also, the characteristic values stored in magnetic head test results database device 1303 are read out from head assembly device 1304, head disk assembly device 1305 and function adjustment device 1306 using the serial number as a search key, and are utilized for process control during manufacturing.

Figure 25:
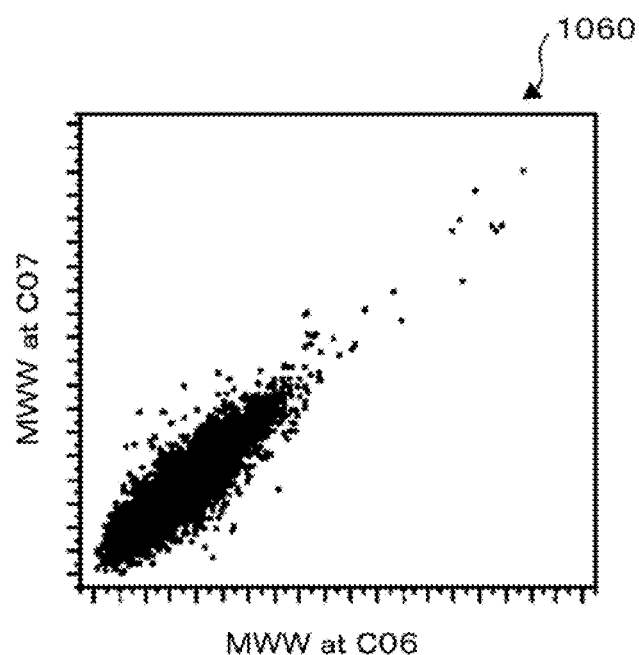
FIG. 25 is a diagram which shows an example of a graph comparing the characteristic values of the writing elements in adjacent heads on the same rowbar, according to one embodiment.

FIG. 25 is an example of the test results that led to one embodiment. In the example shown here, the horizontal axis represents the MWW characteristic of a magnetic head at position C06 on a rowbar, and the vertical axis shows the MWW characteristic of a magnetic head at position C07 on the same rowbar (i.e., the adjacent magnetic head), and the graph shows the distribution of results obtained from large numbers of magnetic head pairs. The correlation coefficient is. more than 0.8, and the error is no more than 6 nm. On investigating the correlation coefficients for similar distributions plotted for all neighboring pairs of heads (C01 and C02, C02 and C03, C03 and C04, C04 and C05, C05 and C06, ..., C58 and C59, C59 and C60), it was found that correlation coefficients of more than 0.8 were obtained not only for MWW as illustrated but also for SQZ and OW. Specifically, it was reasoned that neighboring magnetic heads on the same rowbar have writing elements with similar characteristic values that can be estimated from the characteristic values of other heads in the vicinity.

Figure 26:
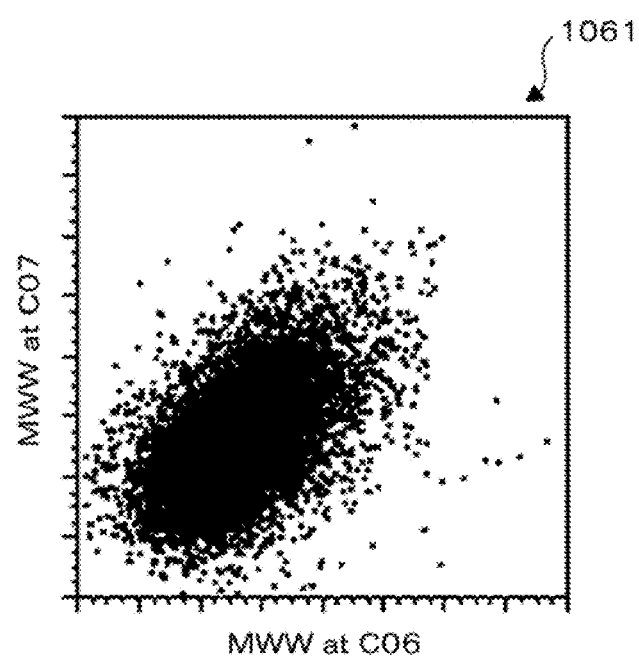
FIG. 26 is a diagram which shows an example of a graph comparing the characteristic values of the reading elements in adjacent heads on the same rowbar, according to one embodiment.

FIG. 26 is an example of the test results that led to one embodiment. In the example shown here, the horizontal axis represents the MRDCR characteristic of a magnetic head at position C06 on a rowbar, and the vertical axis shows the MRDCR characteristic of a magnetic head at position C07 on the same rowbar (i.e., the adjacent magnetic head), and the graph shows the distribution of results obtained from large numbers of magnetic head pairs. The correlation coefficient was less than 0.4. On investigating the correlation coefficients for similar distributions plotted for all neighboring pairs of heads (C01 and C02, C02 and C03, C03 and C04, C04 and C05, C05 and C06,. . . , C58 and C59, C59 and C60), it was found that correlation coefficients of less than 0.4 were obtained not only for MRDCR as illustrated but also for AMP and ASYM. Specifically, it was reasoned that the characteristic values of the reading elements of neighboring magnetic heads on the same rowbar are not very similar, and that estimating these values from the characteristic values of other heads in the vicinity results in low accuracy.

Figure 27:
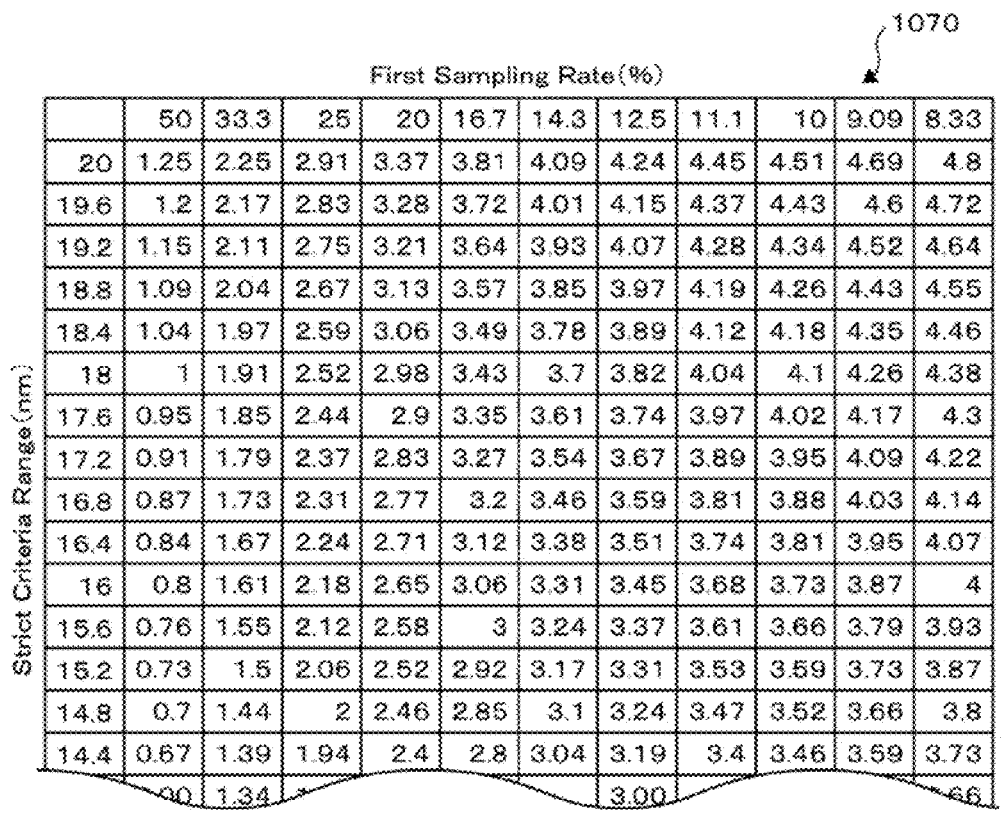
FIG. 27 is a diagram which shows an example of how the inclusion rate of defective heads varies with the first sampling rate and criteria for estimation, according to one embodiment.

FIG. 27 is an example showing how the ratio of defective heads that are transported to the magnetic storage device assembly plant varies with the criteria used for estimation and the first sampling rate, according to one embodiment. In the illustrated example, table 1070 is the result of actual tests performed on manufactured magnetic heads. The leftmost column represents the width from the upper limit to the lower limit in the range of criteria used for estimation, and in the illustrated example, it is the width from the upper limit to the lower limit of MWW. The topmost line is the first sampling rate, i.e., the ratio obtained based on sampling rule 1030 with a denominator equal to the sum of the number of heads classified as tested heads and non-test-candidate heads at step S300, and a numerator equal to the number of tested heads. The cells corresponding to the leftmost column and topmost row contain the ratio of defects included among the magnetic heads. The inclusion rate of defective heads is calculated with the denominator equal to the number of magnetic heads classified as Pass-A, Pass-B, Pass-C or Pass-D that are carried to the magnetic storage device assembly plant, and the numerator equal to the number of defective heads that would not have been included among these heads if the characteristic values of the writing elements of all the magnetic heads had been measured at step S400 or step S401. A smaller inclusion ratio of defective heads means that fewer defective heads are circulated to the magnetic, storage device assembly plant. This table 1070 can be prepared during the period after the development of a new product when it has not yet been mass produced in large numbers.

FIG. 28 is an example showing how the overall sampling rate varies with the first sampling rate and the criteria used for estimation, according to one embodiment. The overall sampling rate is the ratio obtained with a denominator equal to the number of tested and non-test-candidate heads classified at step S300, i.e., the total number of magnetic heads set in the loader of the dynamic electromagnetic test device, and a numerator equal to the result of subtracting the number of heads classified as Pass-C or Pass-D from this total number, i.e., the number of magnetic heads that pass through step S400 or step S401. As the overall sampling value decreases, this means that fewer magnetic heads are subjected to measurements of the characteristic values of their writing elements inside the dynamic electromagnetic test device, and it is possible to produce magnetic heads with a smaller number of dynamic electromagnetic test devices 1201. This table 1071 can be prepared during the period after the development of a new product when it has not yet been mass produced in large numbers.

FIG. 29 is an example of the inclusion rate of defective heads when the overall sampling rate is fixed as obtained from tables 1070 and 1071 shown in FIGS. 27 and 28, respectively, according to one embodiment. The illustrated example shows the relationship between the criteria of the values estimated with an overall sampling rate of 70% or less, the sampling rules, and the inclusion rate of defective heads. The first column from the left represents the width of MWW from the upper limit to the lower limit in the criteria used for estimation. The second column represents the first sampling rate, i.e., the ratio obtained based on sampling rule 1030 with a denominator equal to the sum of the number of heads classified as tested heads and non-test-candidate heads at step S300, and a numerator equal to the number of tested heads. The third column represents the inclusion rate of defective heads, which is calculated with the denominator equal to the number of magnetic heads classified as Pass-A, Pass-B, Pass-C or Pass-D that are carried to the magnetic storage device assembly plant, and the numerator equal to the number of defect heads that would not have been included among these heads if the characteristic values of the writing elements of all the magnetic heads had been measured at step S400 or step S401. This table 1072 can be prepared during the period after the development of a new product when it has not yet been mass produced in large numbers, and the sampling rules and criteria for estimation are determined by taking into consideration the planned level of mass manufacturing and the number of dynamic electromagnetic test devices that are required. For example, if the overall sampling rate must be kept to 70% or less based on the mass production levels and the number of dynamic electromagnetic test devices, then it can be seen that the lowest inclusion rate of defective heads can be obtained by setting the criteria for estimation to 18 nm, and the first sampling rate to 50%.

FIG. 30 is an example of the overall sampling rate determined from 1070 and 1071 shown in FIGS. 27 and 28 respectively when the inclusion rate of defective heads is fixed. The illustrated example shows the relationship between the criteria for estimation, the sampling rules and the overall sampling rate when the inclusion rate of defective heads is 1% or less. The first column from the left represents the width of MWW from the upper limit to the lower limit in the criteria used for estimation. The second column represents the ratio obtained based on sampling rule 1030 with a denominator equal to the sum of the number of heads classified as tested heads and non-test-candidate heads at step S300, and a numerator equal to the number of tested heads. The third column represents the overall sampling rate, which is the ratio obtained with a denominator equal to the number of tested and non-test-candidate heads classified at step S300, i.e., the total number of magnetic heads set in the loader of the dynamic electromagnetic test device, and a numerator equal to the result of subtracting the number of heads classified as Pass-C or Pass-D from this total number, i.e., the number of magnetic heads that pass through step S400 or step S401. This table 1073 can be prepared during the period after the development of a new product when it has not yet been mass produced in large numbers, and the sampling rules and criteria for estimation are determined by taking into consideration the yield of the magnetic storage device assembly plant. For example, if the inclusion rate of defective heads must be kept to 1% or less based on the yield of the assembly plant, then the lowest sampling rate can be obtained by setting the criteria for estimation to 18 nm, and the first sampling rate to 50%. In this case, since the overall sampling rate becomes 69.8%, it can be seen from the mass manufacturing plan that it is sufficient to provide only as many dynamic electromagnetic test devices as are necessary for this level of manufacturing.

Figure 31:
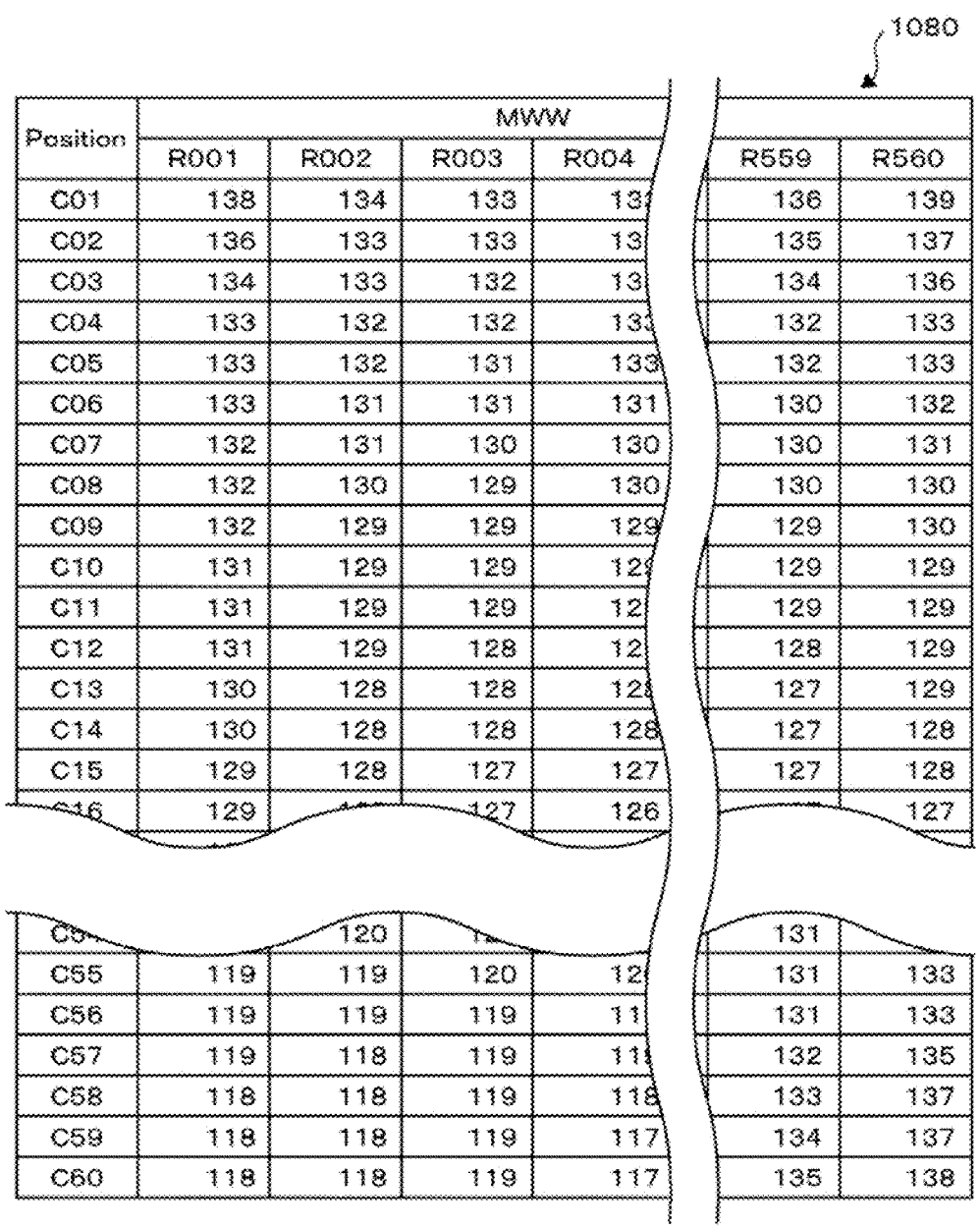
FIG. 31 is a diagram which shows an example of an estimation profile, according to one embodiment.

FIG. 31 is an example of an estimation profile for the characteristic values writing elements, according to one embodiment. This is not necessary when using (Formula 1) to estimate the characteristic values of writing elements, but is used when performing estimation using a combination of (Formula 2) and (Formula 3). The illustrated example of table 1080 pertains to the MWW characteristic value, with the positions C01 through C60 of magnetic heads within the rowbars arranged vertically, and the positions R001 through R560 of rowbars on the wafer arranged horizonfally, and each corresponding cell contains the average or median value of the MWW characteristic of magnetic heads produced in the past. For example, if the rowbar cut away from a certain wafer at step S600 is R003, then the data of the R003 column is used by substituting it into(position in rowbar) in (Formula 2) and (Formula 3). Although the estimation profile shown in table 1080 only relates to the MWW characteristic, similar profiles can be obtained for the SQZ and OW characteristics.

FIG. 32 is an example illustrating the retrieval of static electromagnetic testing results and dynamic electromagnetic testing results stored in magnetic head results database 1303 shown in FIG. 24, according to one embodiment. In the illustrated example of table 1090, a search is performed for the test data of magnetic heads transported to the magnetic storage device assembly plant from the magnetic head manufacturing plant on a particular day. The first column from the left represents the wafer serial number, the second column represents the serial number of a rowbar within the wafer surface, the third column represents the position of a magnetic head within the rowbar, the fourth column represents the results of the static electromagnetic test, the fifth column represents the results of the dynamic electromagnetic test, the sixth column represents a flag indicating whether or not the characteristic values of the writing element are actual measurements or estimated values, and the seventh and subsequent columns represent the characteristic values of the reading element measured by the static electromagnetic test device, the characteristic values of the writing element measured by the dynamic electromagnetic test device, the characteristic values of the writing element estimated by the dynamic electromagnetic testing device, and so on. A characterizing feature of these search results is the flag in the sixth column. The presence of the flag in the sixth column makes it possible to distinguish whether the retrieved characteristic values are actual measurements or estimated values, and in this way it is possible to extract only actual measurements when only actual measurements are required (e.g., when performing failure analysis), and it is possible to extract a mixture of measured and estimated values in the same way when both are needed (e.g., for process control).

FIG. 33 is an example of four ways in which magnetic heads can be combined at step S107, according to one embodiment. In this figure, the upper part is an example of a magnetic head 70 in a magnetic storage device which is partitioned into magnetic heads 70a, 70b, 70c and 70d for the purpose of explaining combination methods 1501, 1502, 1503 and 1504. In combination method 1501, some magnetic heads are classified as Pass-A and Pass-B after measuring the characteristic values of the writing elements, and other magnetic heads are classified as Pass-C and Pass-D based on estimations of their characteristic values without making measurements; regardless of whether the characteristic values are measured or estimated, the magnetic heads classified as Pass-A and Pass-C are assigned to Product Type 1, and the magnetic heads classified as Pass-B and Pass-D are assigned to Product Type 2. An advantage of this combination method 1501 is that work carried out at the assembly plant is simpler than in other combination methods because no distinction is made between measured and estimated characteristic values. In combination method 1502, heads classified as Pass-A or Pass-B based on actual measurements are assigned to the magnetic heads 70b and 70c towards the inside of the magnetic storage device, while the heads assigned to the outer magnetic heads 70a and 70d may be classified based on actual measurements or estimated characteristic values. This combination method 1502 is useful when wishing to avoid assigning Pass-C or Pass-D elements (whose characteristic values have only been estimated rather than measured) to the inside of a magnetic storage device. In combination method 1503, magnetic writing elements with a broader MWW characteristic, for example, are assigned to the inner magnetic heads 70b and 70c of the magnetic storage device, and magnetic writing elements with a narrower MWW characteristic are assigned to the outer magnetic heads 70a and 70d of the magnetic storage device. In combination method 1504, magnetic heads classified as Pass-A, Pass-B, Pass-C and Pass-D are assigned by respectively allocating them into Product Type 6, Product Type 7, Product Type 8 and Product Type 9. This could be described as a method where the classification results from the magnetic head manufacturing plant are used directly. Although four combination methods have been described in this example, the present invention is not limited to these four methods. A magnetic head combination method can be chosen to achieve the maximum yield based on the relationship between the arrangement of magnetic heads inside the magnetic storage device, the yield of magnetic storage devices, and the characteristic values of the magnetic heads.

Embodiments of the manufacturing of a magnetic storage device and the magnetic head components used therein have been described above. However, the concept of the present invention is not limited to the manufacturing of magnetic storage devices and their constituent magnetic heads, and can be similarly applied to items such as liquid crystal displays for projectors, solar cells, and semiconductors where a plurality of components can be obtained from a single substrate.

Figure 34:
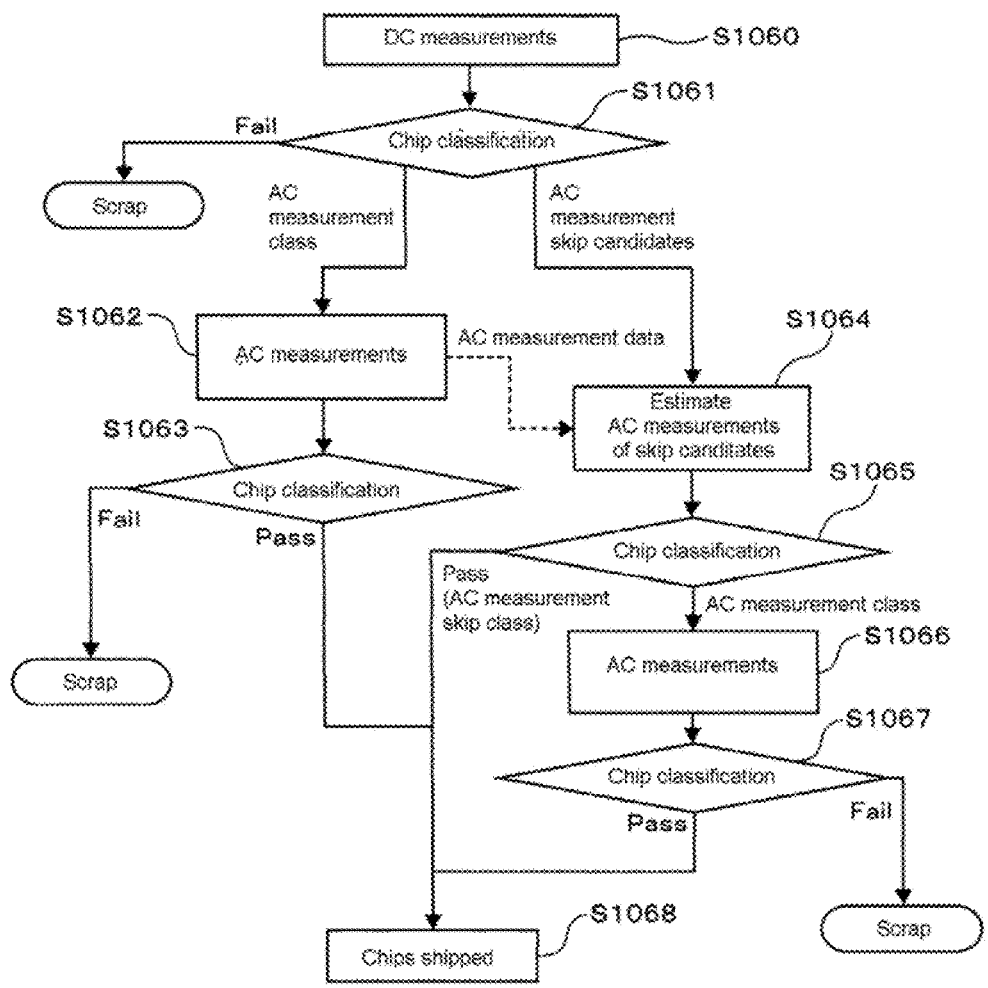
FIG. 34 is a diagram which shows an example of a semiconductor test procedure, according to one embodiment.

FIG. 34 is an electrical test method applied to a semiconductor, according to one embodiment. The semiconductor is used to form a large number of chips in the surface of a wafer, and electrical testing is performed at the stage where the chip formation has been completed. After the electrical testing, the chips are cut away from the wafer by dicing, and are subjected to bonding and molding to form the finished products. The electrical testing of the chips first involves performing DC (direct current) measurements and screening out the chips that fail this test. The chips that pass the DC test are then subjected to AC (alternating current) measurements, and the chips that fail these measurements are also screened out. Here, fails such as short circuits and open circuits that are discovered in the DC tests often occur at random positions on the wafer surface, while fails such as transistor timing fails that are discovered in the AC tests tend to exhibit some degree of correlation with their position on the wafer surface. Consequently, in the concept of the present invention, the DC items are measured for all chips, while the AC items can be subjected to sampling tests.

Thus, at step S1060, the DC items are measured for all the chips on the wafer surface, and at step S1061, the chips are classified into chips that have failed the tests, chips that have passed and will be subjected to AC measurements, and skip candidate chips that have passed the DC test but are selected to bypass the AC measurements. At step S1062, AC measurements are performed on the chips selected for AC measurements, and at step S1063, the measurement results of step 1062 are compared with criteria to classify the chips into Pass and Fail categories. Meanwhile, at step S1064, the results of step S1062 are used to estimate the results of AC measurements on the skip candidate chips. At step S1065, the chips are classified into Pass and AC measurement classes by comparing the estimation results of step S1064 with criteria for estimation. At step S1066, the chips in the AC measurement class are subjected to AC measurements, and at step S1067, the measurement results of step S1066 are compared with the reference values to classify the chips into Pass and Fail categories. In this way, chips that are judged as Pass at step S1063, step S1065 or step S1067 can be sent on to the assembly plant where bonding and molding are performed.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In particular, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a physical computer readable medium having computer code thereon. A computer readable medium can include any physical medium capable of storing computer code thereon for use by a computer, including optical media such as read only and writeable CD and DVD, magnetic memory or medium (e.g., hard disk drive), semiconductor memory (e.g., FLASH memory and other portable memory cards, etc.), etc. A computer readable medium may also include a signal medium such as a wire, network link, wireless link, etc. across which data and/or instructions may be transmitted.

Figure 35:
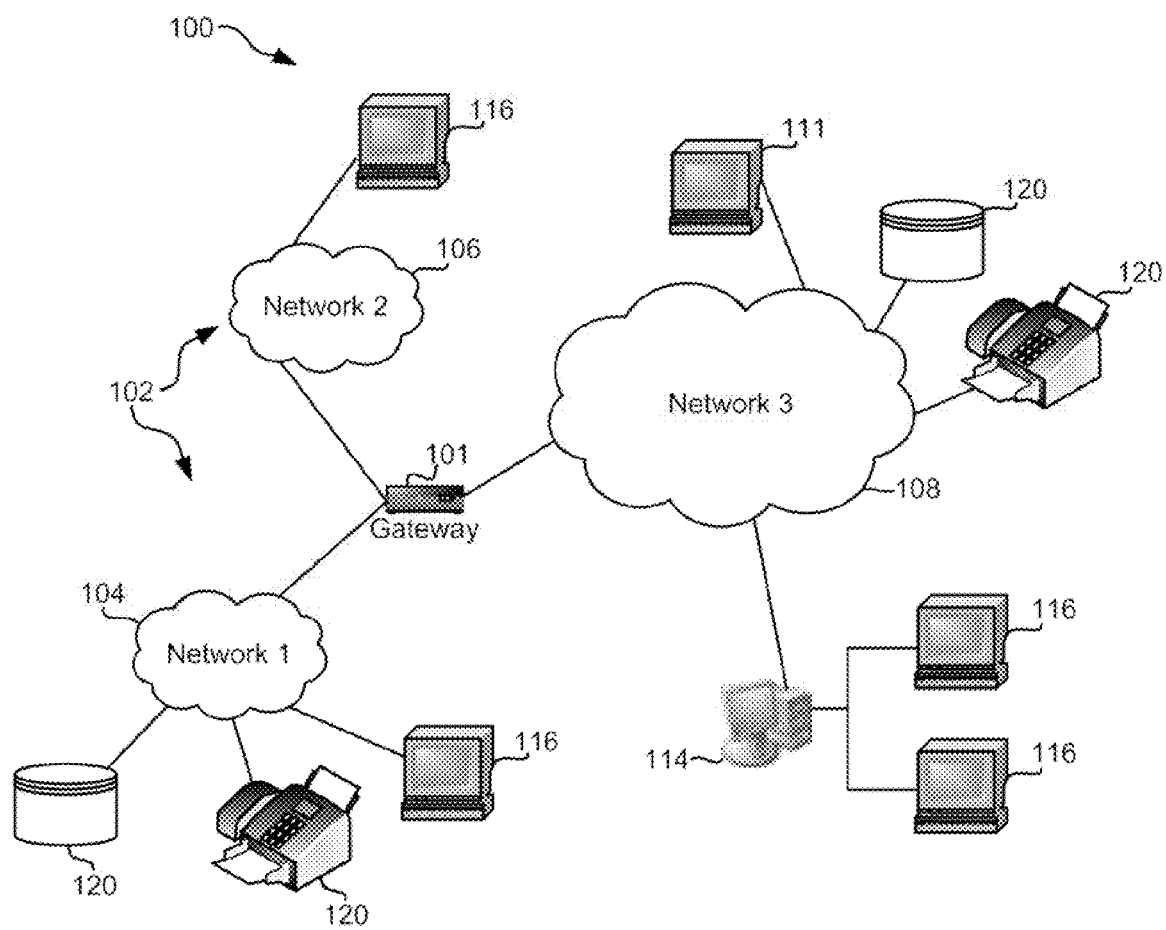
FIG. 35 illustrates a network architecture, in accordance with one embodiment.

FIG. 35 illustrates a network architecture 100, in accordance with one embodiment. As shown in FIG. 35, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and our of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series or peripherals 120, e.g. facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

Figure 36:
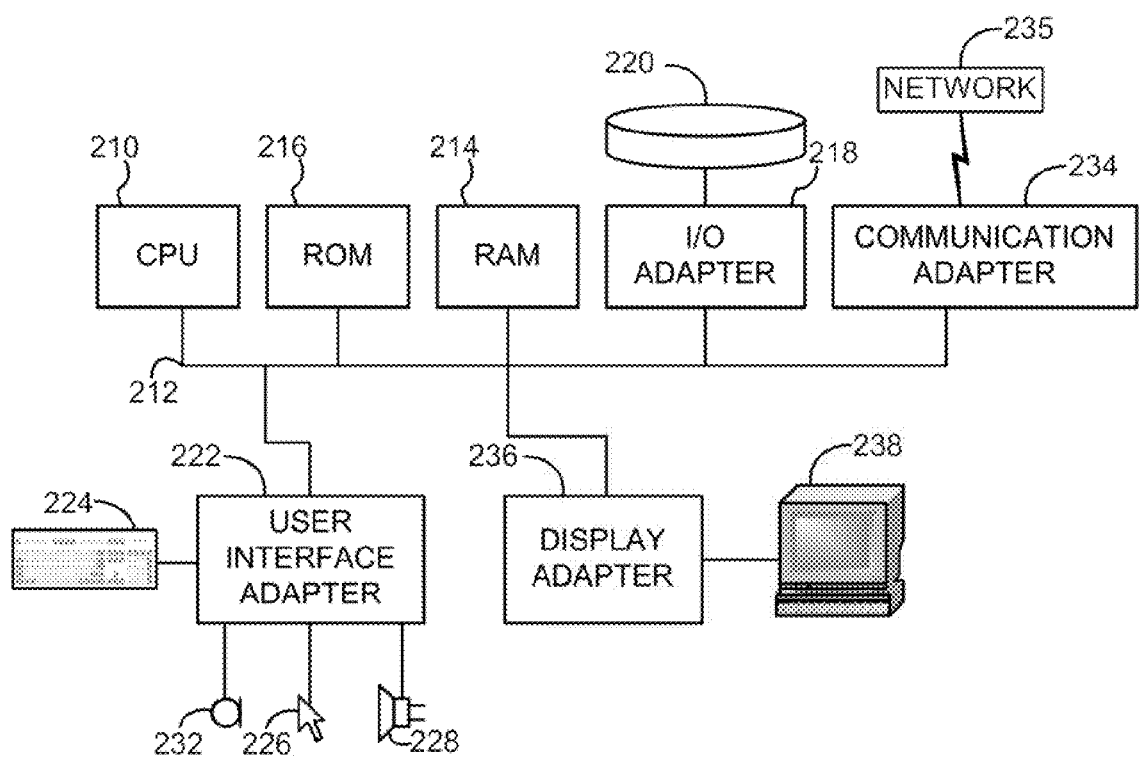
FIG. 36 shows a representative hardware environment that may be associated with the servers and/or clients of FIG. 35, in accordance with one embodiment.

FIG. 36 shows a representative hardware environment associated with a user device 116 and/or server 1.14 of FIG. 35, in accordance with one embodiment. Such figure illustrates a typical hardware configuration of a workstation having a central processing unit 210, such as a microprocessor, and a number of other units interconnected via a system bus 212.

The workstation shown in FIG. 36 includes it Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

In even more embodiments, a system or a computer program product may carry out the steps described herein, according to various embodiments. For example, a system may include logic adapted for classifying each of a plurality of magnetic heads into one of: a first tested head class, and a non-test-candidate head class; logic adapted for determining characteristic values of the magnetic heads classified in the first tested head class; logic adapted for estimating characteristic values of the magnetic heads classified in the non-test-candidate head class, wherein the estimating is based on the characteristic values of the magnetic heads classified in the first tested head class; logic adapted for classifying each of the magnetic heads classified in the non-test-candidate head class into one of: a second tested head class, and a non-test head class, wherein the classifying is based on the estimated characteristic values of the magnetic heads classified in the non-test-candidate head class; logic adapted for determining characteristic values of the magnetic heads classified in the second tested head class; and logic adapted for screening magnetic heads in the second tested head class based on the determined characteristic values of the magnetic heads classified in the second tested head class.

In another embodiment, a computer program product may include computer readable medium having computer readable code stored thereon, the computer readable medium including computer readable code adapted for classifying each of a plurality of magnetic heads into one of: a first tested head class, and a non-test-candidate head class; computer readable code adapted for determining characteristic values of the magnetic heads classified in the first tested head class; computer readable code adapted for estimating characteristic values of the magnetic heads classified in the non-test-candidate head class, wherein the estimating is based on the characteristic values of the magnetic heads classified in the first tested head class; computer readable code adapted for classifying each of the magnetic heads classified in the non-testcandidate head class into one of: a second tested head class, and a non-test head class, wherein the classifying is based on the estimated characteristic values of the magnetic heads classified in the non-test-candidate head class; computer readable code adapted for determining characteristic values of the magnetic heads classified in the second tested head class; and computer readable code adapted for screening magnetic heads in the second tested head class based on the determined characteristic values of the magnetic heads classified in the second tested head class.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method for testing magnetic heads, comprising:
   classifying each of a plurality of magnetic heads into one of: a first tested head class, and a non-test-candidate head class, such that at least two magnetic heads in each rowbar are classified into the first tested head class and remaining magnetic heads in each rowbar are classified into the non-test-candidate head class, each rowbar comprising a linear arrangement of a plurality of magnetic heads;
   determining characteristic values of the magnetic heads classified in the first tested head class via magnetic head testing;
   determining estimated characteristic values of the magnetic heads classified in the non-test-candidate head class, wherein the estimated characteristic values are based on the characteristic values of the magnetic heads classified in the first tested head class near to the magnetic heads in the non-test-candidate head class in each rowbar;
   classifying each of the magnetic heads classified in the non-test-candidate head class into one of: a second tested head class, and a non-test head class, wherein the classifying is based on a comparison between standard characteristic values of a magnetic head and the estimated characteristic values of the magnetic heads classified in the non-test-candidate head class, such that any magnetic heads which do not have estimated characteristic values equivalent to or better than the standard values are classified into the second tested head class and remaining magnetic heads are classified into the non-test head class; and
   determining characteristic values of the magnetic heads classified in the second tested head class via magnetic head testing.

2. The method as recited in claim 1, wherein the characteristic values comprise at least one of: a resistance of a playback element of a magnetic head (MRDCR), an amplitude of a voltage output from terminals of a magnetic head due to a magnetic field received by the playback element (AMP), and an asymmetry of the voltage (ASYM).

3. The method as recited in claim 1, further comprising screening magnetic heads in the first tested head class based on a comparison between the standard characteristic values and the determined characteristic values of the magnetic heads classified in the first tested head class, wherein magnetic heads in the first tested head class which do not have determined characteristic values equivalent to or better than the standard values are classified as scrap, wherein classifying each of the plurality of magnetic heads comprises using criteria that are different from criteria used for screening the magnetic heads in the first tested head class, and wherein the criteria used for screening comprises at least one of a direct current (DC) measurement test and an alternating current (AC) measurement test.

4. The method as recited in claim 1, further comprising screening magnetic heads in the second tested head class based on a comparison between the standard characteristic values and the determined characteristic values of the magnetic heads classified in the second tested head class, wherein magnetic heads in the second tested head class which do not have determined characteristic values equivalent to or better than the standard values are classified as scrap, and wherein classifying the magnetic heads classified in the non-test-candidate head class comprises using criteria that are different from criteria used for screening, and wherein the criteria used for screening comprises at least one of a direct current (DC) measurement test and an alternating current (AC) measurement test.

5. The method as recited in claim 1, wherein determining estimated characteristic values of the magnetic heads classified in the non-test-candidate head class further comprises using characteristic values of the magnetic heads classified in the first tested head class in a rowbar along with characteristic values of other magnetic heads in the rowbar to interpolate characteristic values of the magnetic heads classified in the non-test-candidate head class.

6. The method as recited in claim 1, wherein determining estimated characteristic values of the magnetic heads classified in the non-test-candidate head class further comprises using a difference between pairs of characteristic values corresponding to one position in the rowbar of the magnetic heads classified in the first tested head class in a rowbar and of a profile of characteristic values of other magnetic heads produced previously, wherein the rowbar comprises a linear arrangement of a plurality of magnetic heads.

7. The method as recited in claim 1, further comprising:
   applying flag information indicating that a component is to be tested to the characteristic values of the magnetic heads classified in the first tested head class and the magnetic heads classified in the second tested head class;
   applying flag information indicating that a component is not to be tested to the characteristic values of components of magnetic heads in the non-test head class which are estimated from the characteristic values of magnetic heads in the tested head class; and
   reading out the characteristic values of the tested components and the non-tested components and the corresponding flag information of these components by using serial numbers applied to each of the magnetic heads as search keys.

8. A manufacturing method for magnetic storage device assembled with one or more magnetic heads, the method comprising:
   preparing a substrate for forming a plurality of magnetic heads thereon;
   forming the plurality of magnetic heads on the substrate;
   assembling the plurality of magnetic heads into magnetic storage devices;
   testing at least some of the plurality of magnetic heads to obtain characteristic values;
   determining estimated characteristic values of non-tested magnetic heads on which testing is not performed using the characteristic values of the tested magnetic heads;
   classifying the non-tested magnetic heads based on the estimated characteristic values;

assembling the magnetic heads classified as non-tested magnetic heads into the magnetic storage devices according to assembly rules;

measuring performance of the magnetic storage devices assembled with the non-tested magnetic heads; and screening the magnetic storage devices assembled with the non-tested magnetic heads, wherein the characteristic values comprise at least one of: a resistance of a playback element of a magnetic head (MRDCR), an amplitude of a voltage output from terminals of a magnetic head due to a magnetic field received by the playback element (AMP), and an asymmetry of the voltage (ASYM).

9. A system, comprising:

a processor adapted for executing logic;

logic adapted for classifying each of a plurality of magnetic heads into one of: a first tested head class, and a non-test-candidate head class, such that at least two magnetic heads in each rowbar are classified into the first tested head class, each rowbar comprising a linear arrangement of a plurality of magnetic heads;

logic adapted for determining characteristic values of the magnetic heads classified in the first tested head class via magnetic head testing;

logic adapted for determining estimated characteristic values of the magnetic heads classified in the non-test-candidate head class, wherein the estimated characteristic values are based on the characteristic values of the magnetic heads classified in the first tested head class;

logic adapted for classifying each of the magnetic heads classified in the non-test-candidate head class into one of: a second tested head class, and a non-test head class, wherein the classifying is based on the estimated characteristic values of the magnetic heads classified in the non-test-candidate head class; and logic adapted for determining characteristic values of the magnetic heads classified in the second tested head class via magnetic head testing.

10. The system as recited in claim 9, wherein the logic adapted for classifying the magnetic heads classified in the non-test-candidate head class comprises using criteria that are different from criteria used for screening, and wherein the characteristic values comprise at least one of: a resistance of a playback element of a magnetic head (MRDCR), an amplitude of a voltage output from terminals of a magnetic head due to a magnetic field received by the playback element (AMP), and an asymmetry of the voltage (ASYM).

11. The system as recited in claim 9, further comprising logic adapted for screening magnetic heads in the first tested head class based on the determined characteristic values of the magnetic heads classified in the first tested head class.

12. The system as recited in claim 9, further comprising logic adapted for screening magnetic heads in the non-test-candidate head class based on the estimated characteristic values of the magnetic heads classified in the non-test-candidate head class.

13. The system as recited in claim 9, wherein the logic adapted for determining estimated characteristic values of the magnetic heads classified in the non-test-candidate head class further comprises using characteristic values of the magnetic heads classified in the first tested head class in a rowbar along with characteristic values of other magnetic heads in the rowbar to interpolate characteristic values of the magnetic heads classified in the non-test-candidate head class, wherein the rowbar comprises a linear arrangement of a plurality of magnetic heads.

14. The system as recited in claim 9, wherein the logic adapted for determining estimated characteristic values of the magnetic heads classified in the non-test-candidate head class further comprises using a difference between pairs of characteristic values corresponding to one position in the rowbar of the magnetic heads classified in the first tested head class in a rowbar and of a profile of characteristic values of other magnetic heads produced previously, wherein the rowbar comprises a linear arrangement of a plurality of magnetic heads.

15. The system as recited in claim 9, further comprising:

logic adapted for applying flag information indicating that a component is to be tested to the characteristic values of the magnetic heads classified in the first tested head class and the magnetic heads classified in the second tested head class;

logic adapted for applying flag information indicating that a component is not to be tested to the characteristic values of components of magnetic heads in the non-test head class which are estimated from the characteristic values of magnetic heads in the tested head class; and logic adapted for reading out the characteristic values of the tested components and the non-tested components and the corresponding flag information of these components by using serial numbers applied to each of the magnetic heads as search keys.

16. A computer program product, the computer program product comprising:

a non-transitory computer readable medium having computer readable code stored thereon, the computer readable medium comprising:

computer readable code adapted for classifying each of a plurality of magnetic heads into one of: a first tested head class, and a non-test-candidate head class, such that at least two magnetic heads in each rowbar are classified into the first tested head class and remaining magnetic heads in each rowbar are classified into the non-test-candidate head class, each rowbar comprising a linear arrangement of a plurality of magnetic heads;

computer readable code adapted for determining characteristic values of the magnetic heads classified in the first tested head class via magnetic head testing;

computer readable code adapted for determining estimated characteristic values of the magnetic heads classified in the non-test-candidate head class, wherein the estimated characteristic values is based on the characteristic values of the magnetic heads classified in the first tested head class;

computer readable code adapted for classifying each of the magnetic heads classified in the non-test-candidate head class into one of: a second tested head class, and a non-test head class, wherein the classifying is based on a comparison between the standard characteristic values and the estimated characteristic values of the magnetic heads classified in the non-test-candidate head class, such that any magnetic heads which do not have estimated characteristic values equivalent to or better than the standard values are classified into the second tested head class and remaining magnetic heads are classified into the non-test head class; and computer readable code adapted for determining characteristic values of the magnetic heads classified in the second tested head class via magnetic head testing.

17. The computer program product as recited in claim 16, further comprising computer readable code adapted for screening magnetic heads in the first tested head class based on a comparison between the standard characteristic values and the determined characteristic values of the magnetic heads classified in the first tested head class.

18. The computer program product as recited in claim 17, wherein the computer readable code adapted for classifying the magnetic heads classified in the non-test-candidate head class comprises using criteria that are different from criteria used for screening.

19. The computer program product as recited in claim 16, further comprising computer readable code adapted for screening magnetic heads in the non-test-candidate head class based on a comparison between the standard characteristic values and the estimated characteristic values of the magnetic heads classified in the non-test-candidate head class, wherein magnetic heads in the second tested head class which do not have determined characteristic values equivalent to or better than the standard values are classified as scrap.

20. The computer program product as recited in claim 16, wherein the computer readable code adapted for determining estimated characteristic values of the magnetic heads classified in the non-test-candidate head class further comprises using characteristic values of the magnetic heads classified in the first tested head class in a rowbar along with characteristic values of other magnetic heads in the rowbar to interpolate characteristic values of the magnetic heads classified in the non-test-candidate head class, wherein the rowbar comprises a linear arrangement of a plurality of magnetic heads.

21. The computer program product as recited in claim 16, wherein the computer readable code adapted for determining estimated characteristic values of the magnetic heads classified in the non-test-candidate head class further comprises using a difference between pairs of characteristic values corresponding to one position in the rowbar of the magnetic heads classified in the first tested head class in a rowbar and of a profile of characteristic values of other magnetic heads produced previously, wherein the rowbar comprises a linear arrangement of a plurality of magnetic heads.

22. The computer program product as recited in claim 16, further comprising:
   computer readable code adapted for applying flag information indicating that a component is to be tested to the characteristic values of the magnetic heads classified in the first tested head class and the magnetic heads classified in the second tested head class;
   computer readable code adapted for applying flag information indicating that a component is not to be tested to the characteristic values of components of magnetic heads in the non-test head class which are estimated from the characteristic values of magnetic heads in the tested head class; and
   computer readable code adapted for reading out the characteristic values of the tested components and the non-tested components and the corresponding flag information of these components by using serial numbers applied to each of the magnetic heads as search keys.

* * * * *

UNITED STATES PATENT AND TRADEMARK OFFICE
CERTIFICATE OF CORRECTION

PATENT NO. : 8,552,716 B2
APPLICATION NO. : 12/963551
DATED : October 8, 2013
INVENTOR(S) : Ueda et al.

It is certified that error appears in the above-identified patent and that said Letters Patent is hereby corrected as shown below:

In the specification:

col. 9, line 33 replace "to FIG. I." with --to FIG. 1.--;

col. 11, line 43 replace "5503" with --S503--;

col. 12, line 24 replace "flats." with --flags.--;

col. 13, line 31 replace "5301." with --S301.--;

col. 15, line 14 replace "5300," with --S300,--;

col. 15, line 32 replace "5501," with --S501,--;

col. 15, line 58 delete "a17";

col. 18, line 42 replace "horizonfally," with --horizontally--;

col. 21, line 50 replace "our" with --out--;

col. 22, line 4 replace "1.14" with --114--;

col. 22, line 10 replace "it" with --a--.

Signed and Sealed this
Third Day of December, 2013

Margaret A. Focarino
*Commissioner for Patents of the United States Patent and Trademark Office*